United States Patent
Stevens

(10) Patent No.: US 6,336,177 B1
(45) Date of Patent: *Jan. 1, 2002

(54) METHOD, SYSTEM AND COMPUTER PROGRAM PRODUCT FOR MANAGING MEMORY IN A NON-UNIFORM MEMORY ACCESS SYSTEM

(75) Inventor: Luis F. Stevens, Milpitas, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/417,348

(22) Filed: Oct. 13, 1999

Related U.S. Application Data

(62) Division of application No. 08/933,833, filed on Sep. 19, 1997.

(51) Int. Cl.$^7$ ................................................. G06F 12/02
(52) U.S. Cl. ........................ 711/170; 711/147; 711/148; 711/171; 711/173; 711/153
(58) Field of Search ................................. 709/104, 221, 709/223, 224, 226; 711/147, 148, 153, 170, 171, 173; 706/14

(56) References Cited

U.S. PATENT DOCUMENTS

| | | | |
|---|---|---|---|
| 4,823,111 A | 4/1989 | Tsuchiya et al. | 340/825.05 |
| 4,855,903 A | 8/1989 | Carleton et al. | 364/200 |
| 5,093,913 A | * 3/1992 | Bishop et al. | 711/152 |
| 5,161,156 A | 11/1992 | Baum et al. | 714/4 |
| 5,228,127 A | * 7/1993 | Ikeda et al. | 709/211 |

(List continued on next page.)

FOREIGN PATENT DOCUMENTS

EP     0 478 131 A2     4/1992

OTHER PUBLICATIONS

Chandra, R. et al., "Data Distribution Support on Distributed Shared Memory Multiprocessors", Proceedings of the SIGPLAN 97 Conference on Programming Language Design and Implementation.*
Las Vegas, NV, Jun. 1997.*
Kumar et al., *Introduction to Parallel Computing*, Benjamin Cummings Publ., 1994, pp. 29–58.
Lenoski, D. and Weber, W.D., *Scalable Shared–Memory Multiprocessing*, Morgan Kaufman Publishers, 1995, pp. xi–xv, 1–40, 87–95, 143–203 and 311–316.

(List continued on next page.)

*Primary Examiner*—Than Nguyen
(74) *Attorney, Agent, or Firm*—Sterne, Kessler, Goldstein & Fox, P.L.L.C.

(57) ABSTRACT

A memory management and control system that is selectable at the application level by an application programmer is provided. The memory management and control system is based on the use of policy modules. Policy modules are used to specify and control different aspects of memory operations in NUMA computer systems, including how memory is managed for processes running in NUMA computer systems. Preferably, each policy module comprises a plurality of methods that are used to control a variety of memory operations. Such memory operations typically include initial memory placement, memory page size, a migration policy, a replication policy and a paging policy. One method typically contained in policy modules is an initial placement policy. Placement policies may be based on two abstractions of physical memory nodes. These two abstractions are referred to herein as "Memory Locality Domains" (MLDS) and "Memory Locality Domain Sets" (MLDSETs). By specifying MLDs and MLDSETS, rather than physical memory nodes, application programs can be executed on different computer systems regardless of the particular node configuration and physical node topology employed by the system. Further, such application programs can be run on different machines without the need for code modification and/or re-compiling.

18 Claims, 16 Drawing Sheets

U.S. PATENT DOCUMENTS

| | | | |
|---|---|---|---|
| 5,237,673 A | 8/1993 | Orbits et al. | 711/170 |
| 5,247,673 A | 9/1993 | Costa et al. | 711/205 |
| 5,247,676 A | 9/1993 | Ozur et al. | 709/304 |
| 5,261,097 A | 11/1993 | Saxon | 709/106 |
| 5,269,013 A | 12/1993 | Abramson et al. | 711/170 |
| 5,325,526 A | 6/1994 | Cameron et al. | 709/102 |
| 5,345,588 A | 9/1994 | Greenwood et al. | 709/107 |
| 5,349,664 A | 9/1994 | Ikeda et al. | 713/2 |
| 5,430,850 A | 7/1995 | Papadopoulos et al. | 709/303 |
| 5,490,274 A * | 2/1996 | Zbikowski et al. | 711/112 |
| 5,555,404 A | 9/1996 | Torbjornsen et al. | 707/202 |
| 5,560,029 A | 9/1996 | Papadopoulos et al. | 711/25 |
| 5,590,326 A | 12/1996 | Manabe | 711/150 |
| 5,592,625 A | 1/1997 | Sanberg | 711/151 |
| 5,671,225 A | 9/1997 | Hooper et al. | 370/468 |
| 5,692,193 A | 11/1997 | Jagannathan et al. | 709/106 |
| 5,713,002 A | 1/1998 | Zbikowski et al. | 711/112 |
| 5,717,926 A | 2/1998 | Browning et al. | 709/104 |
| 5,727,150 A | 3/1998 | Laudon et al. | 709/215 |
| 5,745,652 A | 4/1998 | Bigus | 706/214 |
| 5,745,703 A | 4/1998 | Cejtin et al. | 709/238 |
| 5,752,031 A | 5/1998 | Cutler et al. | 709/103 |
| 5,761,505 A | 6/1998 | Golson et al. | 713/100 |
| 5,771,383 A | 6/1998 | Magee et al. | 709/300 |
| 5,784,697 A | 7/1998 | Funk et al. | 711/170 |
| 5,805,593 A | 9/1998 | Busche | 370/396 |
| 5,812,771 A | 9/1998 | Fee et al. | 395/200.31 |
| 5,862,338 A | 1/1999 | Walker et al. | 395/200.54 |
| 5,864,851 A | 1/1999 | Breitbart et al. | 707/8 |
| 5,870,564 A | 2/1999 | Jensen et al. | 709/24 |
| 5,909,540 A | 6/1999 | Carter et al. | 395/182.02 |
| 5,911,149 A | 6/1999 | Luan et al. | 711/147 |
| 5,958,010 A | 9/1999 | Agarwal et al. | 709/224 |
| 5,974,536 A | 10/1999 | Richardson | 712/215 |
| 6,006,255 A | 12/1999 | Hoover et al. | 709/216 |
| 6,049,853 A | 4/2000 | Kingsbury et al. | 711/147 |

OTHER PUBLICATIONS

Coxeter, H.S.M., *Regular Polytopes*, 3rd Edition, Dover, 1993 (entire book).

Goodheart, B. and Cox, J., *The Magic Garden Explained: The Internals of UNIX System V Release, An Open Systems Design*, Prentice–Hall, 1994 (entire book).

Hennessy and Patterson, *Computer Architecture: A Quantative Approach*, Second Edition, pp. ix–xii and 634–760, Morgan and Kaufman Publishing, 1996.

Hwang, K., *Advanced Computer Architecture: Parallelism, Scalability, Programmability*, McGraw–Hill, 1993 (enitre book).

"A Smay Group Strategic Analysis: SGI/CRAY Link Up For the Next Challenge," Smaby Group, Inc., 1996, pp. 1–6, printed from http://www.smaby.com/sgiccray.html. on Apr. 16, 1997.

Catanzaro, *Multiprocessor System Architectures: A Technical Survey of Multiprocessor/Multithreaded System Using SPARC®, Multilevel Bus Architectures, and Solaris®* (SunOS™) , Sun Microsystems, Inc., 1994 (entire book).

Chandra, R. et al., "Data Distribution Support on Distributed Shared Memory Multiprocessors", to appear in Proceedings of the SIGPLAN 97 Conference on Programming Language Design and Implementation, Las Vegas, NV, Jun. 1997.

Coulouris et al., *Distributed Systems: Concepts and Design*, Second Edition, Addison–Wesley Publishing, 1994 (entire book).

Bolosky, William et al., "NUMA Policies and Their Relation to Memory Architecture," *Proceedings of ASPLOS*, Apr. 1991, pp. 212–221.

Cox, Alan L. and Fowler, Robert J., "The Implementation of a Coherent Memory Abstraction on a NUMA Multiprocessor: Experiences with Platinum," *Proceedings of the Twelfth ACM Symposium on Operating Systems Principles*, Dec. 3–6, 1989, pp. 32–44.

LaRowe, Richard P., Jr. and Ellis, Carla S., "Page Placement Policies for NUMA Multiprocessors," *Journal of Parallel and Distributed Computing*, vol. 11, No. 2, Feb. 1991, pp. 112–129.

* cited by examiner

METHOD, SYSTEM AND COMPUTER PROGRAM PRODUCT FOR MANAGING MEMORY IN A NON-UNIFORM MEMORY ACCESS SYSTEM

This is a division of application Ser. No. 08/933,833, filed Sep. 19, 1997.

BACKGROUND OF THE INVENTION

1. Field of the Invention

The present invention relates generally to allocation of memory in a computer system with distributed memory, and more particularly to a method for representing the locality of memory for a multi-processor non-uniform memory access (NUMA) computer system.

2. Related Art

A distributed memory computer system typically includes a plurality of physically distinct and separated processing nodes. Each node has one or more processors, input output (I/O) devices and main memory that can be accessed by any of the processors. The main memory is physically distributed among the processing nodes. In other words, each processing node includes a portion of the main memory. Thus, each processor has access to "local" main memory (i.e., the portion of main memory that resides in the same processing node as the processor) and "remote" main memory (i.e., the portion of main memory that resides in other processing nodes).

For each processor, the latency associated with accessing local main memory is significantly less than the latency associated with accessing remote main memory. Further, for many NUMA systems, the latency associated with accessing remote memory increases as the topological distance between the node making a memory request (requesting node) and the node servicing the memory request (servicing node) increases. Accordingly, distributed memory computer systems as just described are said to represent non-uniform memory access (NUMA) computer systems.

In NUMA computer systems, it is desirable to store data in the portion of main memory that exists in the same processing node as the processor that most frequently accesses the data (or as close as possible to the processor that most frequently accesses the data). Accordingly, it is desirable to allocate memory as close as possible to the processing node that will be accessing the memory. By doing this, memory access latency is reduced and overall system performance is increased.

Therefore, controlling memory management is an essential feature in multi-processor systems employing NUMA architectures. In conventional systems, the operating system typically controls memory management functions on behalf of application programs. This is typically accomplished through the use of predetermined memory management procedures designed to produce a certain level of locality. For example, such procedures include program code to accomplish page migration and page replication. In this fashion, data is dynamically moved and/or replicated to different nodes depending on the current system state. However, such predetermined operating system procedures may not be optimal for all types of program applications.

Thus, what is needed is a system and method for producing a high degree of locality in a NUMA system that works well with a variety of different types of application programs.

SUMMARY OF THE INVENTION

Accordingly, the present invention is directed toward a memory management and control system that is selectable at the application level by an application programmer (also referred to herein as "user"). The memory management and control system is based on the use of policy modules (PMs). PMs are used to specify and control different aspects of memory operations in NUMA computer systems. Policy modules are used to specify how memory is managed for processes (or "threads") running in NUMA computer systems.

Preferably, each PM comprises a plurality of methods that are used to control a variety of memory operations. Such memory operations typically include initial memory placement, memory page size, a migration policy, a replication policy and a paging policy. In one example of an implementation of the present invention, different PMs are specified for particular sections of an application's virtual address space.

In this manner, when a NUMA system needs to execute an operation to manage a particular section of an application's virtual address space, it uses the methods provided by the policies specified by the PM that is currently connected (or attached) to the particular section of virtual address space.

In a preferred embodiment, the memory management and control system of the present invention provides application programmers with the ability to select different policies for different sections of the virtual address space down to the granularity of a single memory page. In one implementation, default policies are used each time a thread begins execution. The application programmer has the option to continue using the default policies or to specify different PMs comprising different methods.

One method typically contained in PMs is an initial placement policy ("placement policy"). The placement policy defines algorithms used by a physical memory allocator ("memory scheduler"), to determine what memory source is to be used for allocating memory pages. The goal of the placement policy is to place memory is such a way that local accesses are maximized.

In a preferred embodiment of the present invention, placement policies are based on two abstractions of physical memory nodes. These two abstractions are referred to herein as "Memory Locality Domains" (MLDs) and "Memory Locality Domain Sets" (MLDSETs). One advantage to using MLDs and MLDSETs is that they facilitate the portability of application programs. That is, by specifying MLDs and MLDSETs, rather than physical memory nodes, application programs can be executed on different computer systems regardless of the particular node configuration and physical node topology employed by the system. Further, such application programs can be run on different machines without the need for code modification and/or re-compiling.

MLDs are specified as having a center node and a particular radius. Thus, a particular MLD with a center C and a radius R is a source of physical memory comprising all memory nodes within a "hop distance" (described below) of R from a center node located at C. Generally, an application programmer defining MLDs specifies the MLD radius and lets the operating system determine the center node. The center node is typically based on a number of factors and includes additional parameters that are specified by the application programmer. Such additional parameters include configuration topology and input/output (I/O) device affinity.

For example, MLDSETs allow an application programmer to specify a device affinity for one or more MLDs. Thus, if an application program is associated with a particular I/O device, such device is specified when creating an MLDSET that will be associated with that section of a thread's virtual address space comprising code that interacts with the particular I/O device. In this fashion the operating system automatically places the application code associated with the I/O device as close as possible to the node containing the I/O device.

In addition, MLDSETs allow an application programmer to specify a specific topology for MLDs. For example, an application programmer can specify that the MLDs comprising a particular MLDSET should be arranged in a cube or a cluster topology. In addition, application programmers also have the option to specify physical nodes for the placement of MLDSETs.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention is described with reference to the accompanying drawings, wherein.

DETAILED DESCRIPTION OF THE PREFERRED EMBODIMENTS

The present invention is directed toward a memory management and control system that is selectable at the application level by an application programmer for increasing locality to reduce latency and increase overall system performance. In an example embodiment, the present invention can be implemented as software in an IRIX™ or Cellular IRIX™ operating system executed by an Origin™ scalable, distributed shared-memory multi-processor platform, manufactured by Silicon Graphics, Inc., Mountain View, Calif.

The present invention shall now be discussed in greater detail. As such, it is helpful to first discuss examples of a NUMA system, interconnection networks and locality management. These examples are provided to assist in the description of the memory management and control techniques according to a preferred embodiment of the present invention. The examples below refer to an implementation of the present invention that is embodied as specific software within an operating system. The use of the term operating system is for exemplary purposes only. Thus, the term operating system and the other examples used herein should not be construed to limit the scope and breadth of the present invention.

Example NUMA System

Figure 1A:
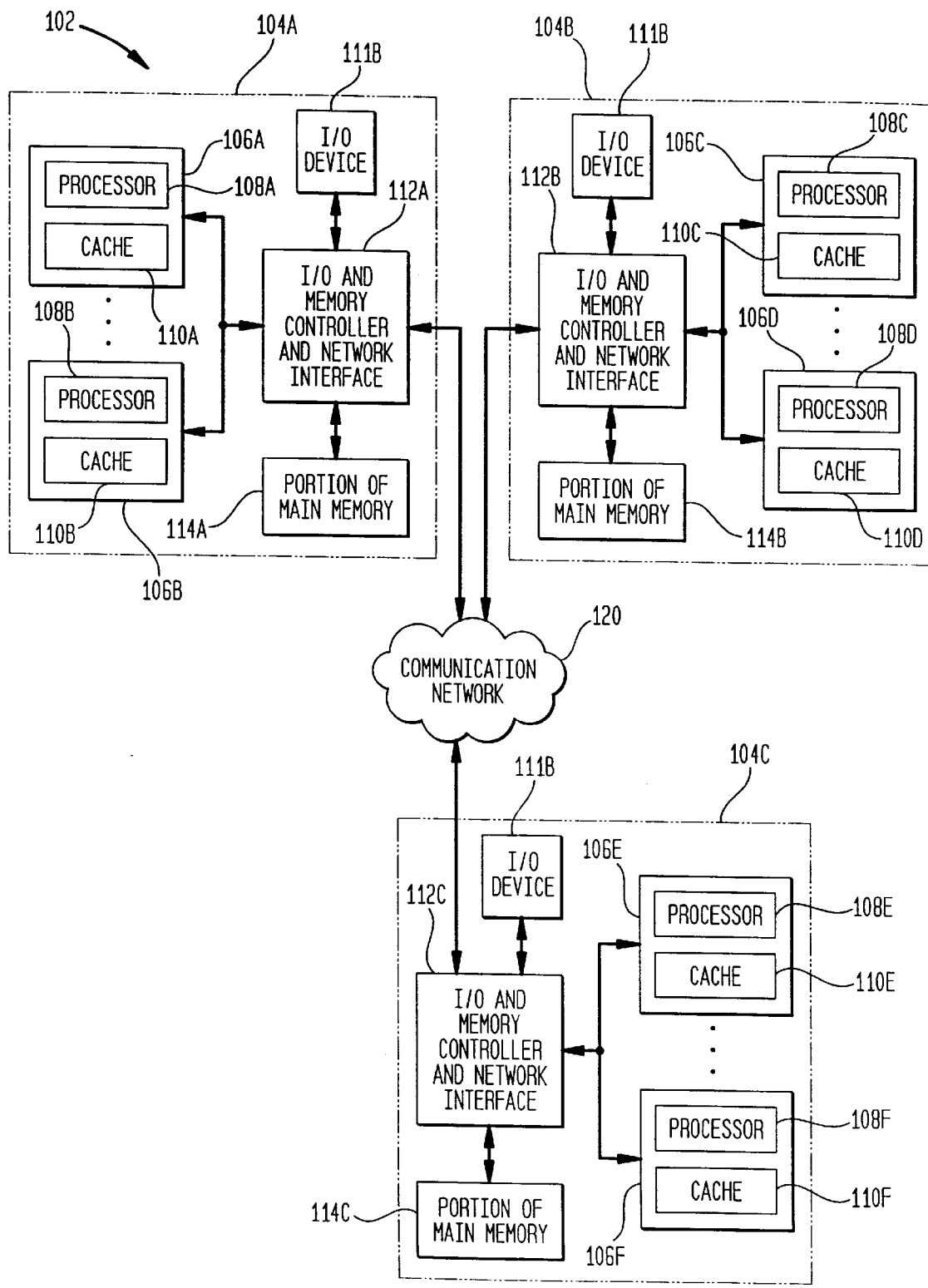
FIG. 1 A is a block diagram of a non-uniform memory access (NUMA) computer system.
FIG. 1B is a block diagram of a portion of main memory.
Figure 2A:
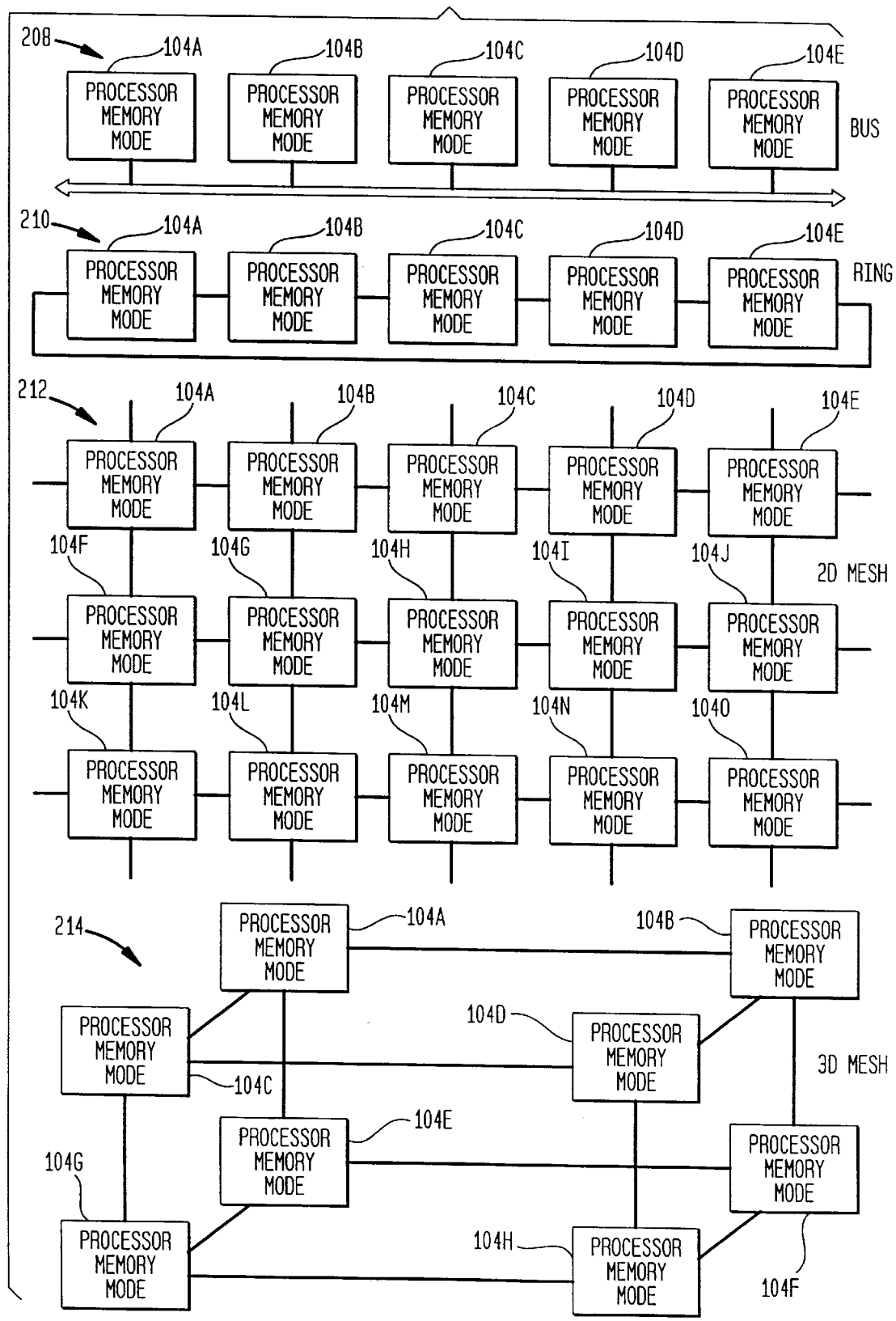
FIG. 2A is a block diagram depicting examples of common interconnection networks according to a preferred embodiment of the present invention.

FIG. 1A is a block diagram of a non-uniform memory access (NUMA) computer system 102. The computer system 102 includes a plurality of processing nodes 104A–104C, which are physically distinct and physically separated from one another. The processing nodes 104A–104C communicate with each other over a communication network 120, representing any well known data communication means, such as a bus, multistage interconnection network, local area network, wide area network, etc., or any combination thereof. Examples of common interconnection networks are depicted in FIG. 2A, and described below.

Each processing node 104 includes one or more computing nodes 106. Preferably, each processing node 104 includes two computing nodes 106, although each processing node 104 may alternatively include other numbers of computing nodes 106. Each computing node 106 includes a processor 108 and a cache 110. Each processing node 104 also includes a memory controller and network interface 112. The processors 108 in any particular processing node 104 communicate with other devices connected to the communication network 120 via the memory controller and network interface 112 contained in that processing node 104.

Each processing node 104 can also include a portion of main memory 114. The portions of main memory 114 in all of the processing nodes 104 collectively represent the main memory of the computer system 104. Generally, any processor 108 in any processing node 104, can access data stored in the portion of main memory 114 contained in any of the processing nodes 104. Access to data contained in the portion of main memory 114 of any particular processing node 104 is controlled by the memory controller and network interface 112 contained in that same processing node 104.

Figure 1B:
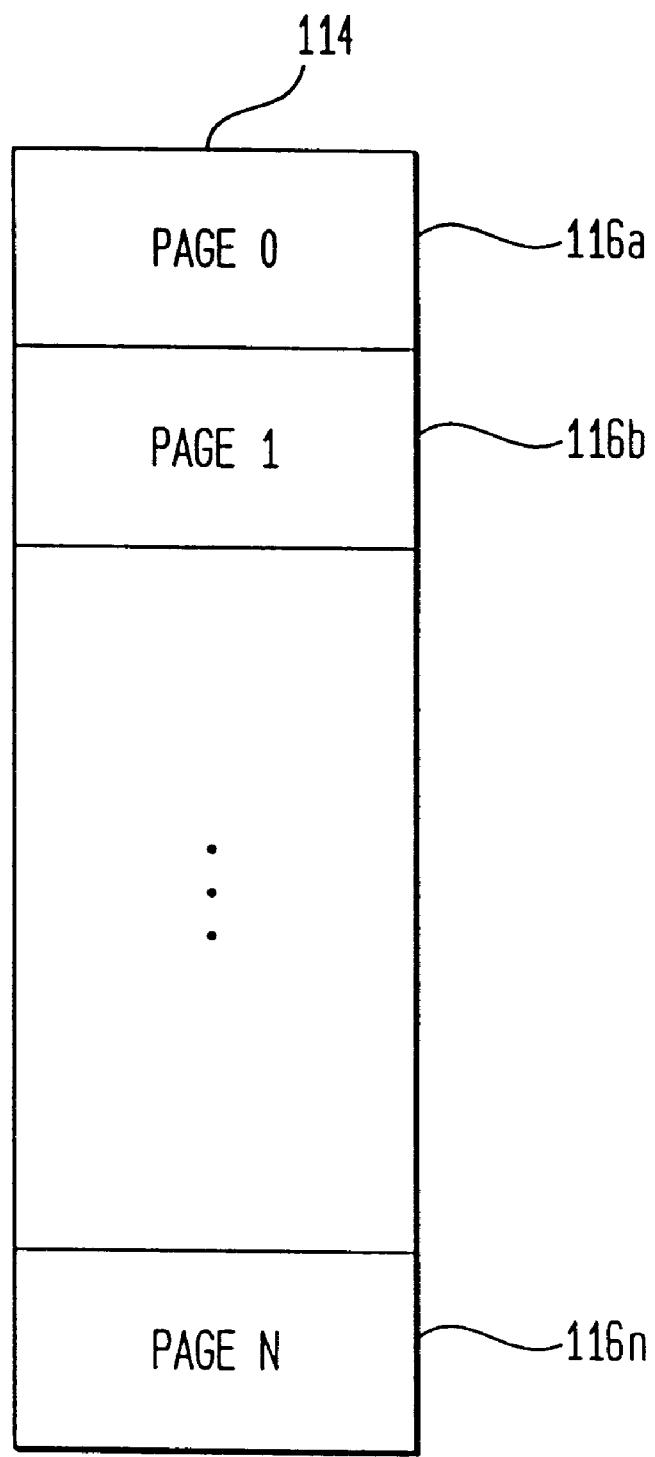

FIG. 1B is a more detailed block diagram of a portion of main memory 114. Each portion of main memory 114 includes N memory pages 116a–116n (individually labeled page 0, page 1, . . . , page N). Preferably, each memory page 116 is 16 Kbytes in size, although the present invention operates equally well with other memory page sizes and with varying memory page sizes. The value of N is implementation dependent. In some implementations the value of N is user selectable.

Example Interconnection Networks

FIG. 2A is a block diagram depicting examples of interconnection networks that can be used as the communication network 120, according to an embodiment of the present invention. FIG. 2A shows a bus system 208, a ring system 210, a 2D mesh system 212 and a 3D mesh system 214. The bus system 208 is used in many conventional computer systems. Using the bus system 208, the processor memory nodes 104A–E communicate to each other by broadcasting messages over the single shared bus. A disadvantage of using the bus system 208, is that the system is not scalable because the bus bandwidth does not increase as additional process or memory nodes 104 are added. In fact, adding processing nodes 104 to the bus system 208 causes a decrease in the overall system bandwidth.

In contrast, the ring system 210, the 2D mesh system 212 and the 3D mesh system 214, all provide interconnections that are scalable. That is, adding process or memory nodes 104 to these systems causes an increase to the overall communication bandwidth of the network 120. It is important to note that the mesh networks 210, 212 and 214 have an additional characteristic in common. Specifically, the time it takes to communicate from one node 104 to another node 104, depends upon the topological distance between the nodes 104. That is, the further away one node is from another node, the longer it takes to communicate between the two. This is the reason such systems are referred to an non-uniform memory access systems.

To illustrate this characteristic, the following example is presented. In the following example, it is assumed that the communication time between adjacent nodes 104 is 100 nanoseconds (ηs.) in each of the networks depicted in FIG. 2A. Thus, for the ring topology network 210, a message from node 104A to node 104B takes 100 ηs. However, a message from 104A to 104E takes 400 ηs. because it must first travel through the nodes 104B, 104C, and 104D.

Referring now to the 2D mesh 212, it can be seen that a message between the nodes 104A and 104O takes 600 ηs. It should be noted that alternate paths are available using this topology. In general, path redundancy is one of the advantages of using mesh network technology, such as the 2D 212 and the 3D 214 mesh networks. For example, communications between the nodes 104A and 104O can take the path—104A-104B-104C-104D-104E-104J-104O. Likewise, the alternate path—104A-104F-104K-104L-104M-104N-104O can also be used. As can be seen, there are many other possible paths that can be taken. In this fashion, alternate paths can be taken with other paths are blocked, out of service, congested, or otherwise unavailable.

Likewise, path redundancy exists in the 3D mesh technology, such as the 3D mesh 214. For example, the path 104A-104C-104D-104B can be used to send a message between nodes 104A and 104B. Note that using this path, the communication takes 300 µs to complete. In contrast, by using a shorter path, (e.g. the path 104A-104B), it takes only 100 µs. to complete the same communication.

Figure 2B:
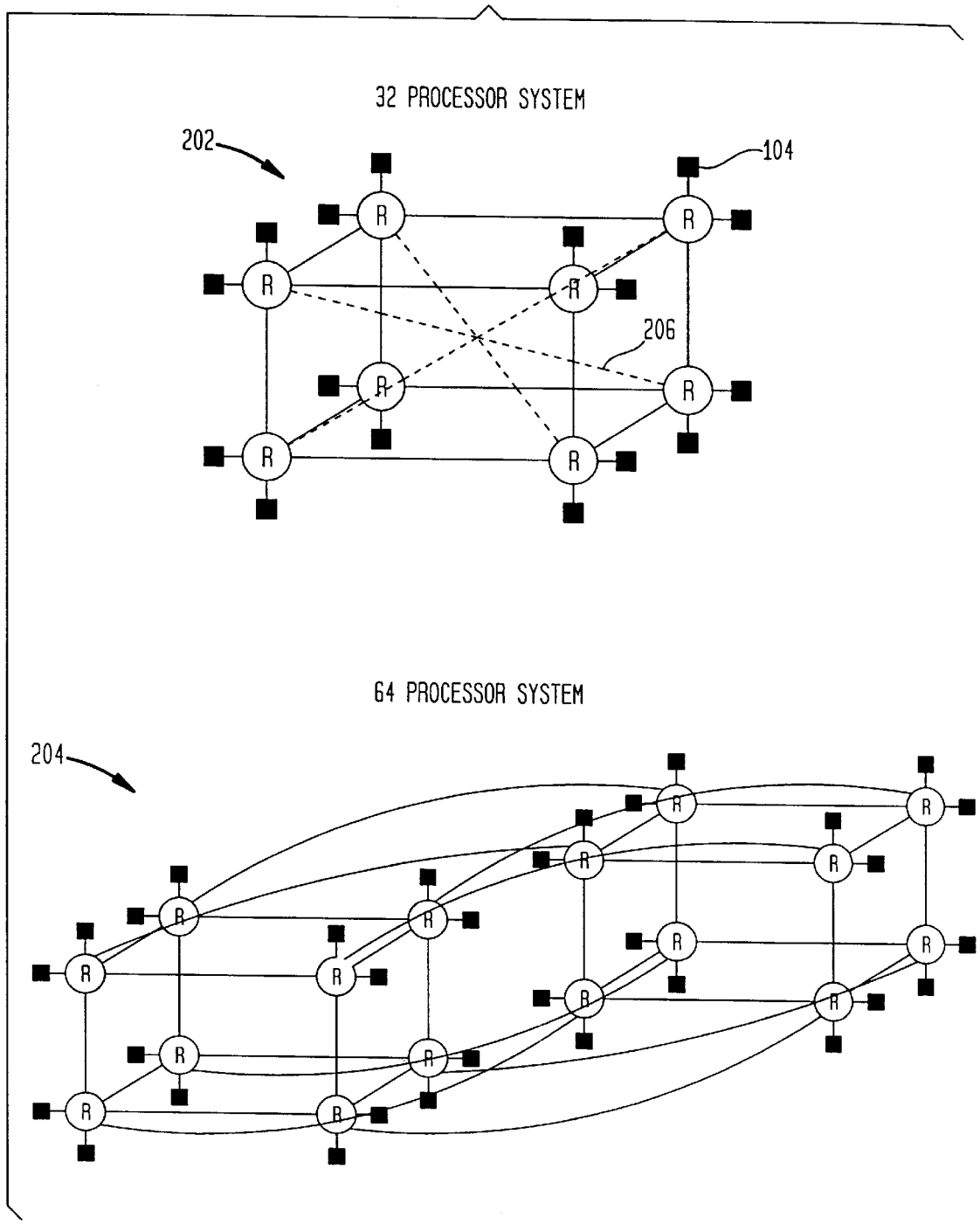
FIG. 2B depicts examples of multi processor systems, according to a preferred embodiment of the present invention.

In a preferred embodiment of the present invention, 3D mesh topology 214 is used for the communication network 120. An example of a 32 and 64 processor system using 3D mesh topology is shown in FIG. 2B. In this example, a 32 processor system 202 comprises 16 nodes 104, each comprising 2 processors, such as the processor 106 (not shown in FIG. 2B). Note that in this example, additional links 206 are shown as dotted diagonal lines. These additional links serve to increase the node bandwidth and decrease system access latency by creating shorter paths between the nodes 104. An example of a 64 processor system 204 is also depicted in FIG. 2B.

As stated, the present invention operates in combination with a computer system having memory access times dependent upon the topological distance between a requestor node (or "local node") and a server node (or "remote mode"). In the examples used herein, the topological distance is described in terms of the number of "hops" between the nodes. For example, referring back to FIG. 2A, the shortest topological distance between the nodes 104A and 104K, in the 2D mesh topology 212, is 2 hops (i.e. the path—104A-104F-104K). Likewise the topological distance between the nodes 104A and 104F is 1 hop. When memory is being accessed locally, within a single node, the topological distance is referred to herein as being 0 hops.

Note that the present invention can be implemented using a variety of network topologies including those discussed herein, and others not specifically mentioned. However, the definition of the topological distance between nodes in any NUMA system will be apparent to those skilled in the relevant art(s). The topologies of a bus system, ring system, and 2D and 3D meshes are used herein for exemplary purposes only and should not be construed to limit the scope and breadth of the present invention.

Example of Locality Management

As previously stated, an important goal of memory management in NUMA systems is the maximization of locality. FIGS. 3–7 are block diagrams depicting examples useful for describing the management of memory locality in NUMA systems, according to a preferred embodiment of the present invention.

Figure 3:
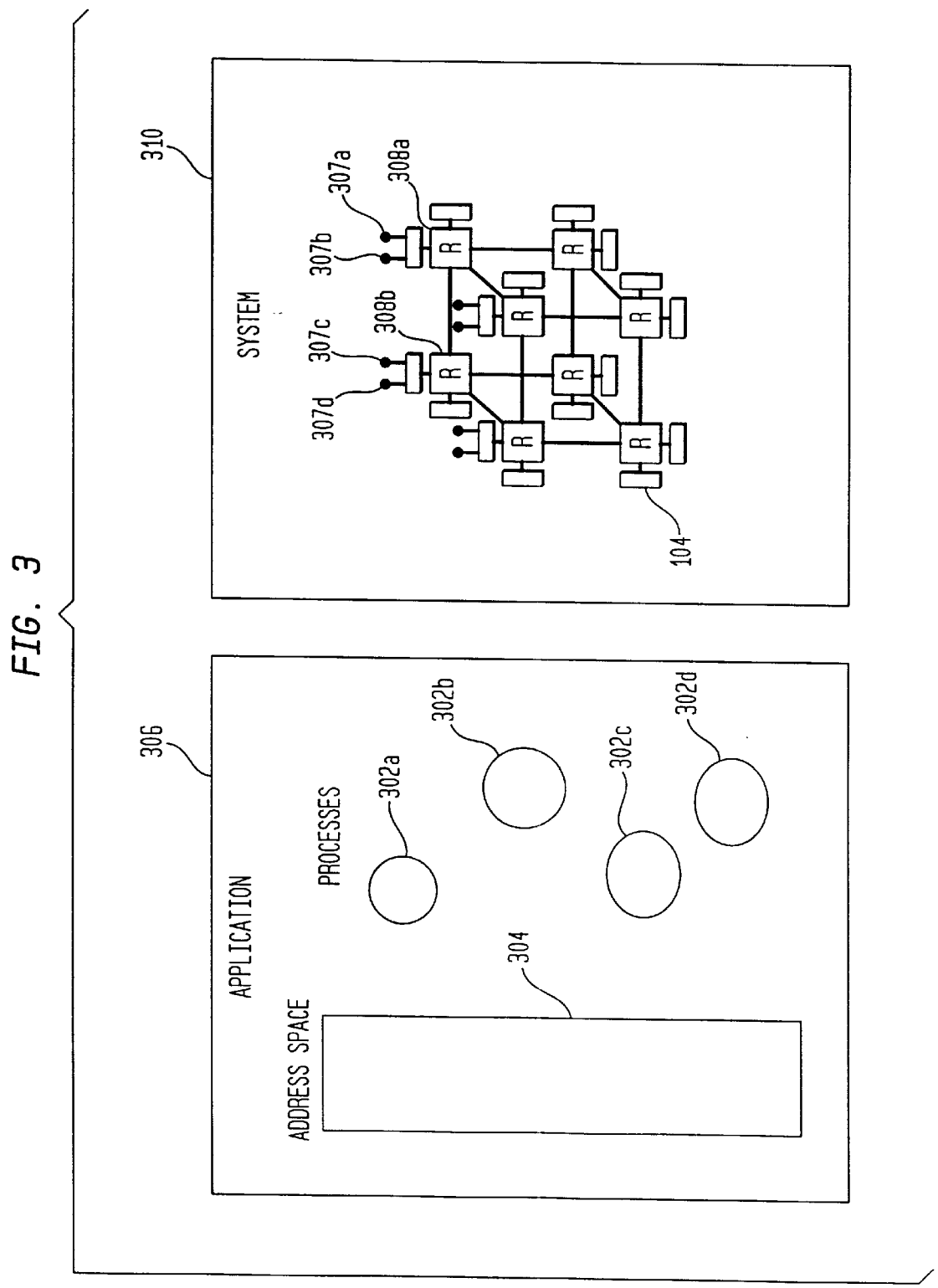
FIG. 3 is a block diagram depicting an example of a NUMA computer system and an application program comprising a number of threads, according to a preferred embodiment of the present invention.
Figure 4:
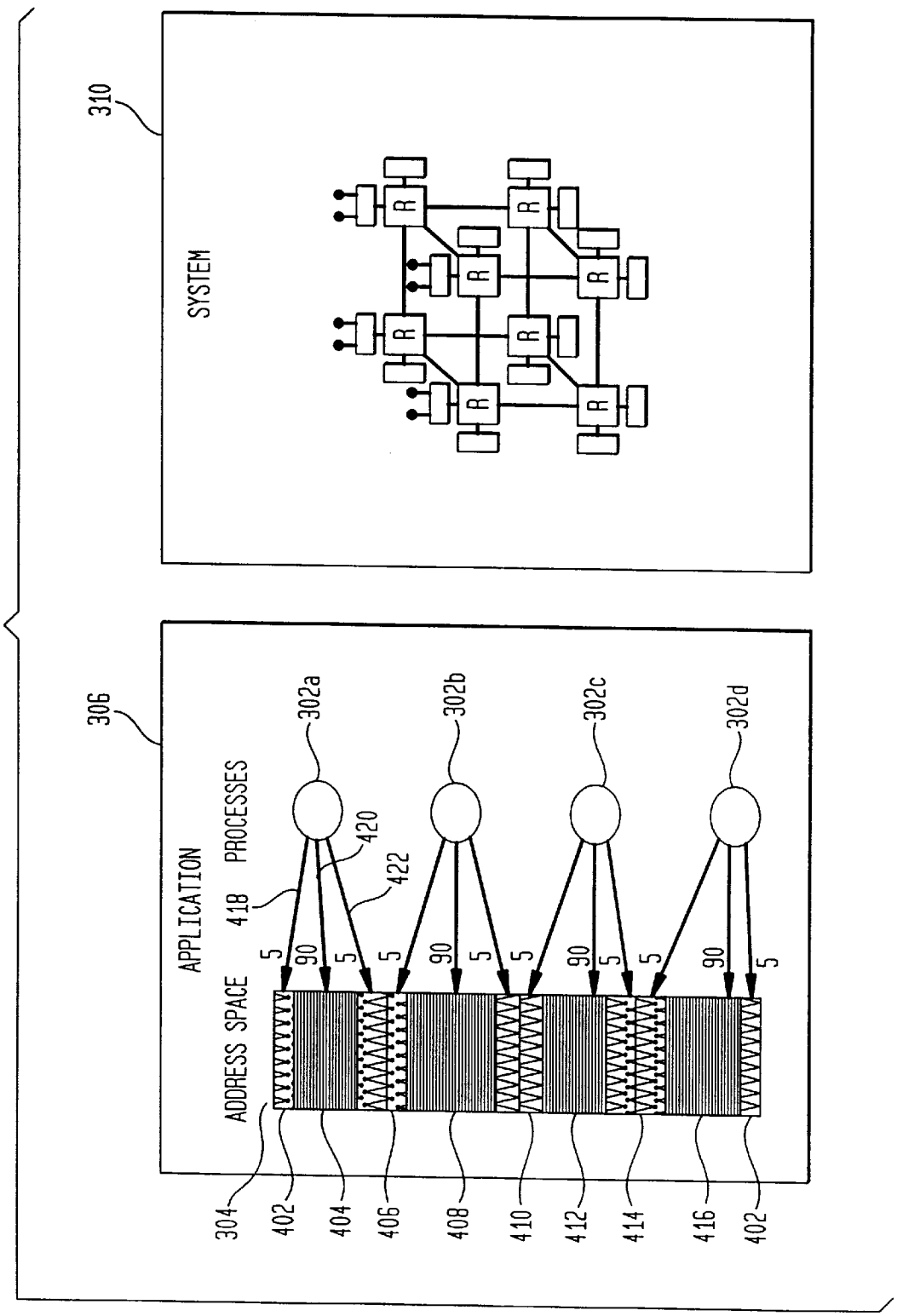
FIG. 4 is a block diagram depicting memory access patterns for an application program.

In the example shown in FIG. 3, an application program 306 is to be executed on a NUMA system 310. The application program 306 comprises 4 processes (also referred to as threads) 302a–302d (generally 302). The application program 306 further comprises a virtual address space 304. An example of a NUMA machine 310 that can be used in a preferred embodiment of the present invention, is an Origin 2000® system manufactured by Silicon Graphics Incorporated.

The NUMA system 310 comprises a plurality of nodes, wherein each node is represented by a rectangle, such as the rectangle 104. Each node further comprises one or more processors, (also referred to as CPUs), such as the CPUs 307a–307d (generally 307). Each node 104 is connected to a router, such as the router 308a and 308b (generally 308). The routers 308 are the gateways to the communication network 120 as previously described.

The application programmer or user in this example, determines the memory access patterns used by each thread 302 in the application 306. This is shown graphically in FIG. 4.

In this example, the address space 304 is broken down into a number of sections 402–416. Each section of virtual address space represents a virtual go address range used by one or more of the threads 302a–302d to access memory. Each section of the virtual address space 304 is shaded to indicate whether it is being shared with another process or whether it is private. In this example, the dark shaded sections of the virtual address space, namely sections 404, 408, 412 and 416 are private. This indicates that they are not shared by two or more threads. The light shaded sections, 402, 406, 410, and 414 indicate that these areas of the virtual address space are shared by at least two threads. Note that in this example, the virtual address space 304 is represented in a wrap-around fashion so that the shared section 402 appears both the top and at the bottom of the virtual address space 304.

Further, each thread 302a–302d is depicted as having three arrows, each pointing to a particular section of memory. For example, the thread 302a is depicted as having an arrow 418 pointing to the memory section 402, an arrow 420 pointing to the memory section 404, and an arrow 422 pointing to the memory section 406. This indicates that during execution, the thread 302a accesses the memory sections 402, 404 and 406.

In addition, each arrow is depicted with a number associated with it. For example, the arrows 418, 420 and 422 are depicted with associated numbers 5, 90 and 5, respectively. These numbers indicate the relative percentage of memory accesses associated with the particular section of memory pointed to by the arrow. For example, the number 5 associated with the arrow 418, indicates that the memory accesses to the section 402 accounts for 5% of the total memory access for the thread 302a.

Accordingly, the memory accesses to the private section of address space 404 accounts for 90% of the memory accesses for the thrad 302a. The remaining 10% of memory accesses for the thread 302a are split between the shared memory segments 402 and 404. That is, 5% of memory accesses (arrow 422) are directed toward a section of shared virtual memory 406. In this example, the section of virtual memory 406 is also being accessed by the thread 302b. Thus, section 406 is designated as a shared section of virtual address space. Likewise, 5% of the memory accesses (arrow 418) for the thread 302a, are directed toward a section of virtual memory 402, which is shared with the thread 302d.

In a similar fashion, 90% of the memory accesses for the threads 302b, 302c and 302d are directed toward a private section memory, 408, 412, and 416, respectively. In addition, each of the threads 302b–302d access memory that is shared with two adjacent threads.

Specifically, 5% of the memory accesses for the thread 302b are directed toward a section of virtual memory 404 that is shared with the thread 302a. Likewise, another 5% of the memory accesses for the thread 302b are directed toward a section of virtual memory 410 that is shared with thread 302c. In addition, 5% of the memory accesses for the thread 302c are directed toward a section of virtual memory 410 that is shared with the thread 302b, and another 5% of the memory accesses for the thread 302c are directed toward a section of virtual memory 414 that is shared with thread 302d.

Finally, 5% of the memory accesses for the thread 302d are directed toward a section of virtual memory 414 that is shared with the thread 302c, and another 5% of the memory accesses for the thread 302d are directed toward a section of virtual memory 402 that is shared with thread 302a.

Figure 5:
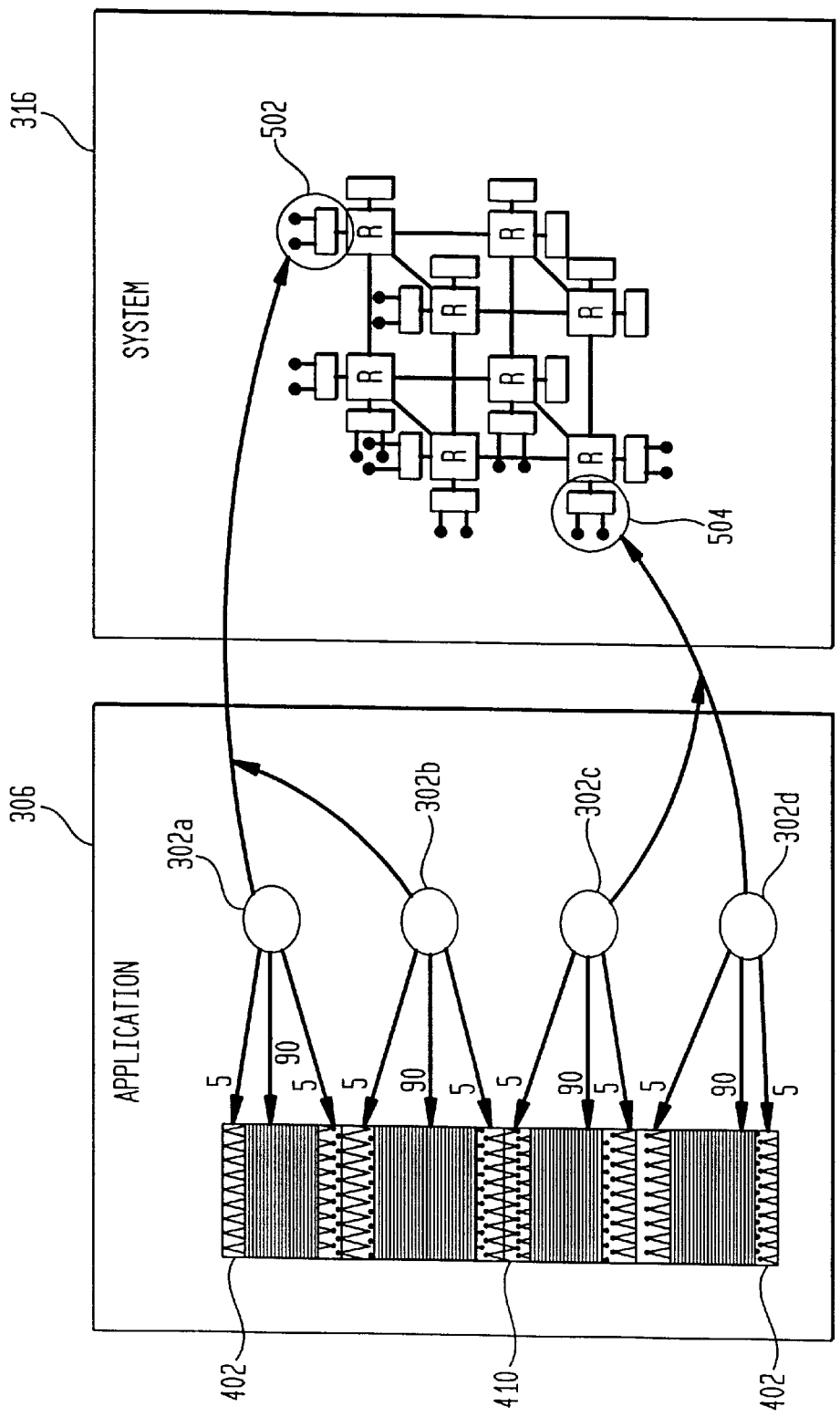
FIGS. 5 and 6 are block diagrams depicting two examples of non-optimal memory placement.

FIG. 5 depicts an example of memory placement that could occur, if the known memory access patterns, as described above with reference to FIG. 4, are not taken into account for the purpose of maximizing memory placement locality. Accordingly, in this example, the threads 302a and 302b are randomly mapped to the node 502, in one corner of the system 316, while the threads 302c and 302d are randomly mapped to the node 504, in the opposite corner of the system 316.

Thus, in this example, the application program 306 is not optimally mapped to the hardware 316 because of the memory sharing that occurs between the threads, as described above. Accordingly, long latencies are expected when such shared memory sections are accessed by threads running in distant CPUs.

For example, suppose the memory represented by the section 410 is mapped to the node 502. In this case, the memory mapping is optimal for the thread 302b, which is being executed in the same node 502, and therefore has local access to the shared memory section 410. However, this mapping is worst case for the thread 302c, which is being executed in the distant node 504, due to the large topological distance between the nodes 504 and 502.

Likewise, suppose the memory represented by the section 402 is mapped to node 504. In this case, the mapping is optimal for the thread 302d but is worst case for the thread 302a.

Figure 6:
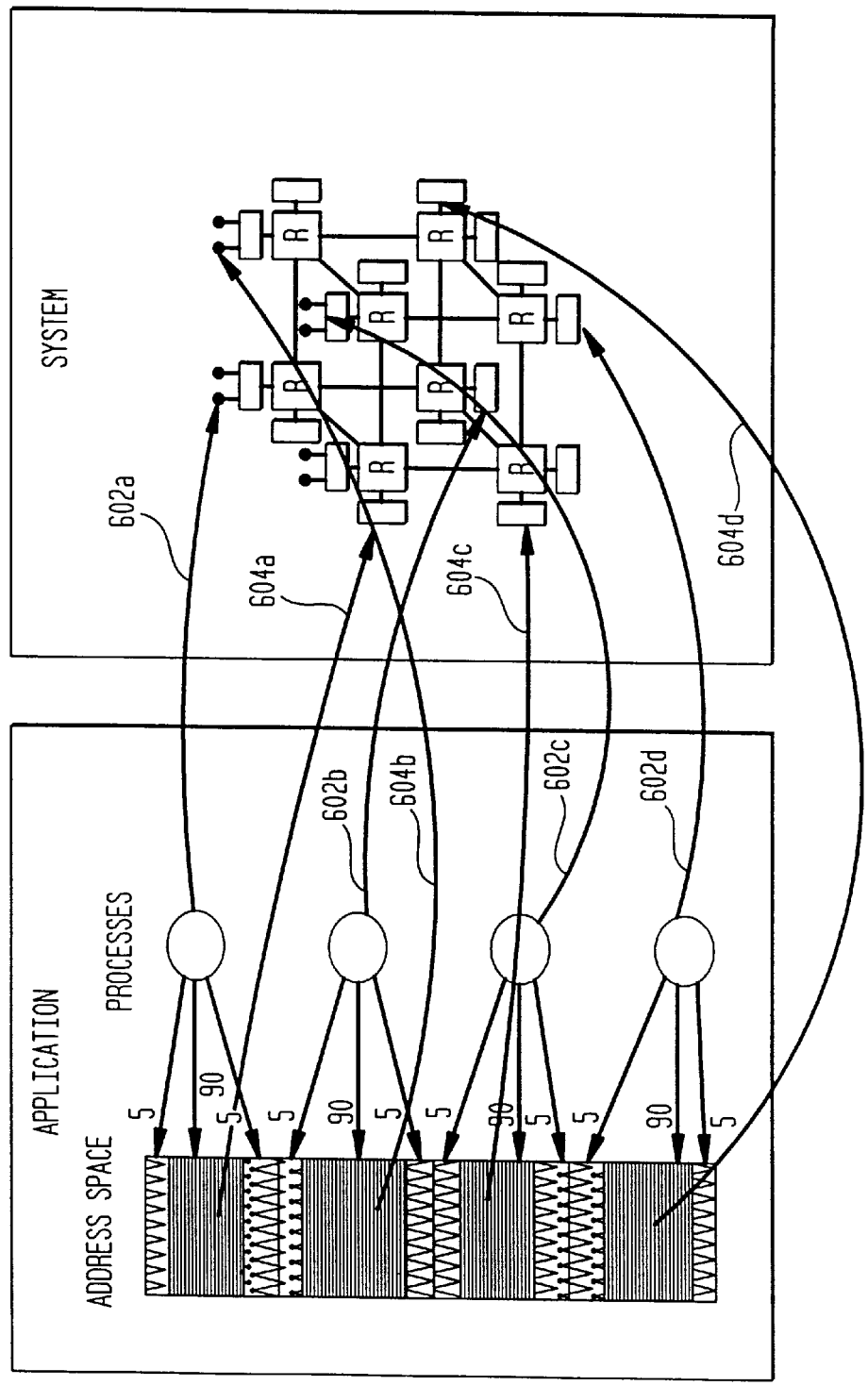

Another example of poor mapping can be seen in FIG. 6. In this example each process 302 is running on different distant nodes (as depicted by the arrows 602a–602d), and the memory is mapped to another set of different and distant nodes (as depicted by the arrows 604a–604d). This is an example of chaotic mapping.

The present invention uses several mechanisms to manage locality and avoid the long latencies associated with the scenarios depicted above. For example, the present invention provides for topology-aware initial memory placement. Further, the present invention allows and encourages application programmers to provide initial placement information or hints to the operating system, using high level tools, compiler directives, and/or direct system calls. Still further, the present invention allows application programmers to select different policies for the most important memory management operations, and/or provide new ad-hoc policies.

The Placement Policy

As stated, the placement policy employed by an embodiment of the present invention, defines the algorithm used by a physical memory allocator to determine what memory source is used for allocating each page of memory in a multi-node machine. The goal of a placement policy is to place memory in such a way that local accesses are maximized.

Ideally, an optimal placement algorithm has perfect pre-knowledge of the exact number of cache misses triggered by each thread sharing the page it is about to place. Using this pre-knowledge, the algorithm would place the page on a node where the thread generating the most cache misses is running. In this example, for simplicity, it is assumed that the thread always runs on the same node. This assumption, may or may not be the case in a specific implementation of the present invention.

The present invention provides a means for optimal initial memory placement by accepting inputs provided by application programmers ("users") related to the desired initial placement of memory. For example, suppose a user desires to allocate memory for the application 306 shown in the previous examples. The desired mapping is depicted graphically in FIG. 7. Accordingly, the two threads 302a and 302b are to be mapped to the 2 CPUs in the node 706. Similarly, the remaining 2 threads 302c and 302b are to be mapped to the 2 CPUs in the adjacent node 708. Further, the memory associated with the first pair of threads 302a and 302b is to be allocated from the first node 706, and the memory associated with the second pair of processes 302c and 302d, is to be allocated from the second node 708.

Note that the shared memory sections 402 and 410 can be allocated from either node 708 or 706. For exemplary purposes, it is assumed that the shared memory section 402 is mapped to the node 706, and the shared memory section 410 is mapped to the node 708.

Thus, this example shows an optimal mapping of the threads 302a–302d, and the associated memory. The mapping is optimal because most memory accesses are local. For example, because the memory section 404 is to be mapped to the same node as the thread 302a, 90% of the memory accesses for the thread 302a is local. The same can be said for the threads 302b, 303c and 302d, with respect to the memory sections 408, 410 and 416, respectively.

Figure 7:
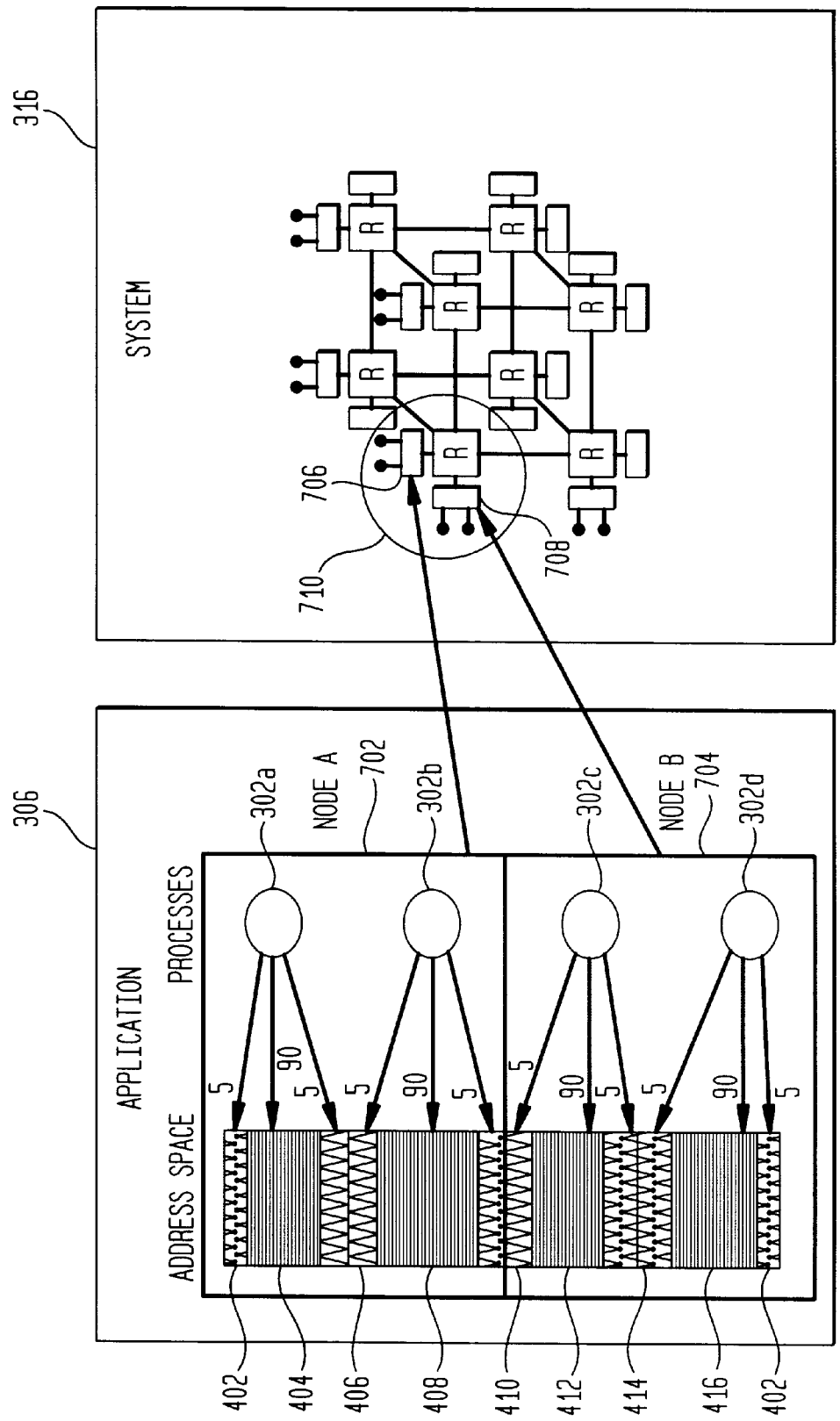
FIG. 7 is a block diagram depicting a desired location for memory allocation for an application program within a multi-node NUMA computer system, according to a preferred embodiment of the present invention.

Further, with the mapping shown in FIG. 7, the memory sharing that occurs between the threads are either local, or at most, one hop away. For example, access to the memory section 406 is local for both threads 302a and 302b. In contrast, access to the memory section 410 is local for the thread 302b, but is remote for thread 302c. However, the remote access to the shared memory 410 is only one hop away from the thread 302c.

Accordingly, the present invention provides a means to implement the desired mapping as described above, by providing for placement policies that are based on two abstractions of physical memory nodes. The abstractions are referred to herein as Memory Locality Domains (MLDs) and Memory Locality Domain Sets (MLDSETs).

Memory Locality Domains

As stated, a Memory Locality Domain (MLD) with a center C and a radius R, is a source of physical memory comprising all memory nodes within a hop distance R of a center node C.

Figure 8:
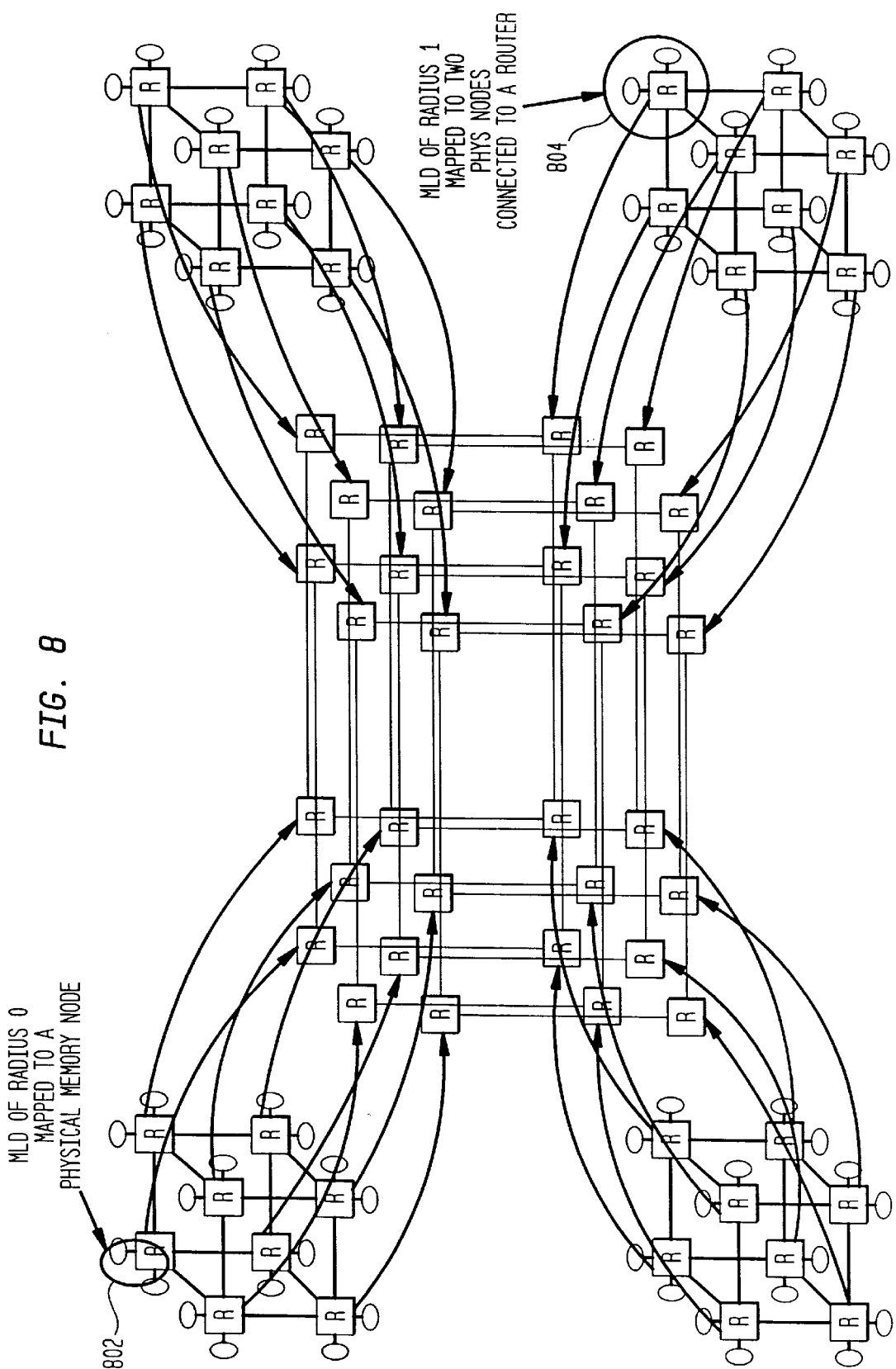
FIG. 8 is a block diagram depicting two MLDs according to a preferred embodiment of the present invention.

FIG. 8 depicts two MLDs according to a preferred embodiment of the present invention. The first MLD 802 has a radius of 0. This indicates that no network hops are required to access memory from a thread attached to its center node. The second MLD 804 has a radius of 1, indicating that at most, 1 network hop is needed to access memory from a thread attached to its center node.

MLDs may be conceptualized as virtual memory nodes. Generally, the application writer defining MLDs specifies the MLD radius R, and lets the operating system decide where it will be centered. Typically, the operating system attempts to select a center node according to current memory availability and other placement parameters that the users specify. Such placement parameters include device affinity and node topology.

The following is an example of an operating system call that can be used in an implementation of the present invention. An example of an operating system that can be used in a preferred embodiment of the present invention is the Cellular IRIX® 6.4 operating system, manufactured by Silicon Graphics Incorporated.

In this example of a preferred embodiment, users can create MLDs using the following operating system call:

pmo_handle_t mld_create (int radius, long size);

In this example, the argument radius is used to define the MLD radius R. The argument size is used to specify the approximate amount of physical memory required for the newly created MLD.

Upon a successful execution of the operating system call, a handle (pmo_handle_t) is returned for the newly created MLD.

Figure 9:
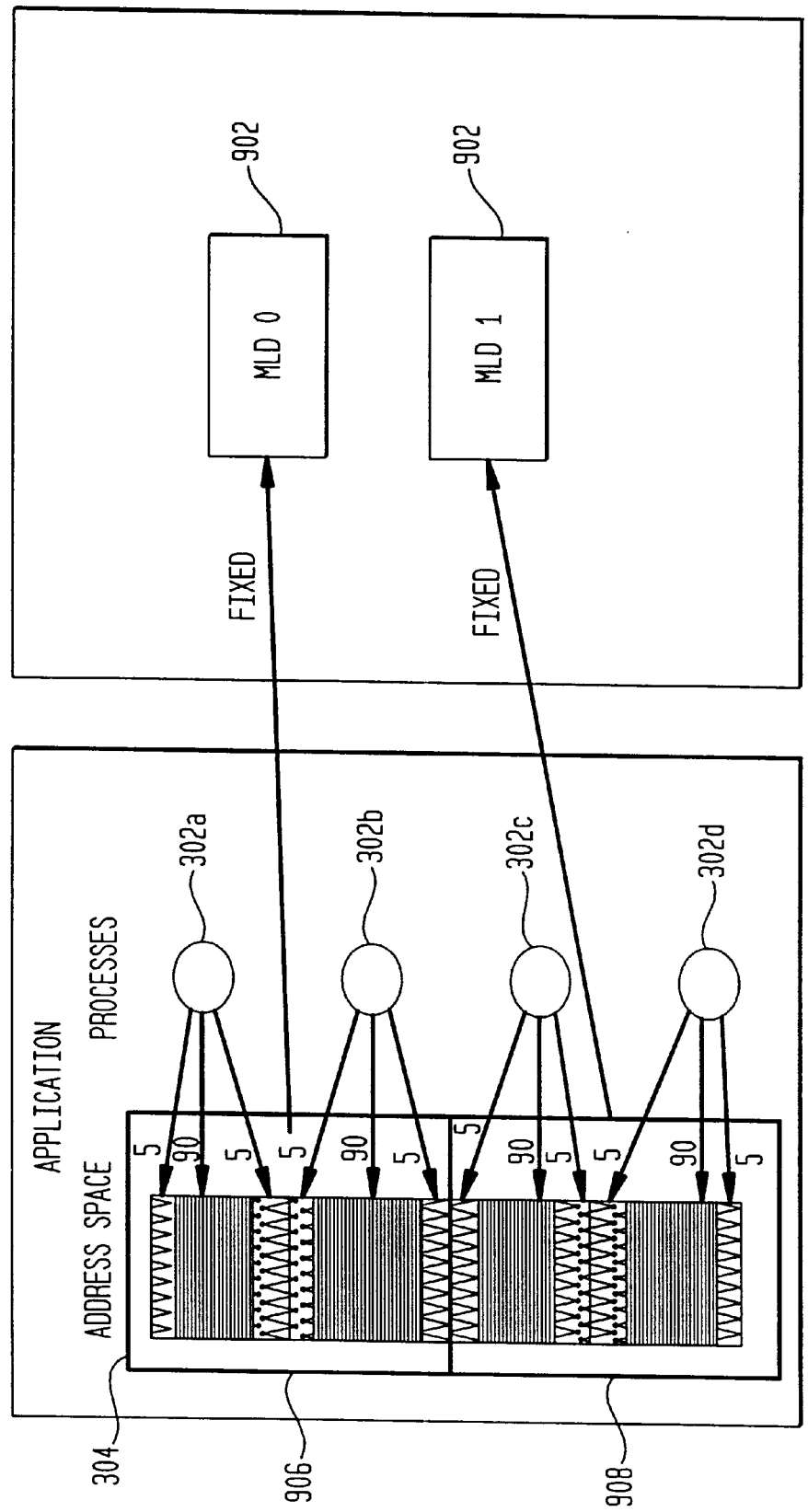
FIG. 9 is a block diagram depicting two MLDs and their association with virtual memory segments.

Referring now to FIG. 9, 2 MLDs 902 and 904 are created. In this example, the virtual address space 304 is divided into two sections. The first section 906 is associated with the MLD 902, and the second section 908 is associated with the MLD 904.

The association of the virtual address sections 906 and 908 with the corresponding MLDs 902 and 904, respectively, are accomplished through the creation and attachment of policy modules (PMs) that include placement policies therein. This concept as well as several examples of methods that can be used to create and attach PMs are fully described below.

It is important to note that in a preferred embodiment, the MLDs 902 and 904 are not physically placed when they are created. As described below, the MLDs 902 and 904 are placed only after they are made part of an MLDSET.

Memory Locality Domain Sets

In a preferred embodiment, Memory Locality Domain Sets or MLDSETs are used to define topology and resource affinity for one or more MLDs. For example, in the example described above, 2 MLDs 902 and 904 are created. In this example, if no topological information is specified, the operating system is free to place them anywhere. However, because of the memory sharing as described above with reference to FIG. 4, it is desired to place the 2 MLDs 902 and 904 as close as possible.

Figure 10:
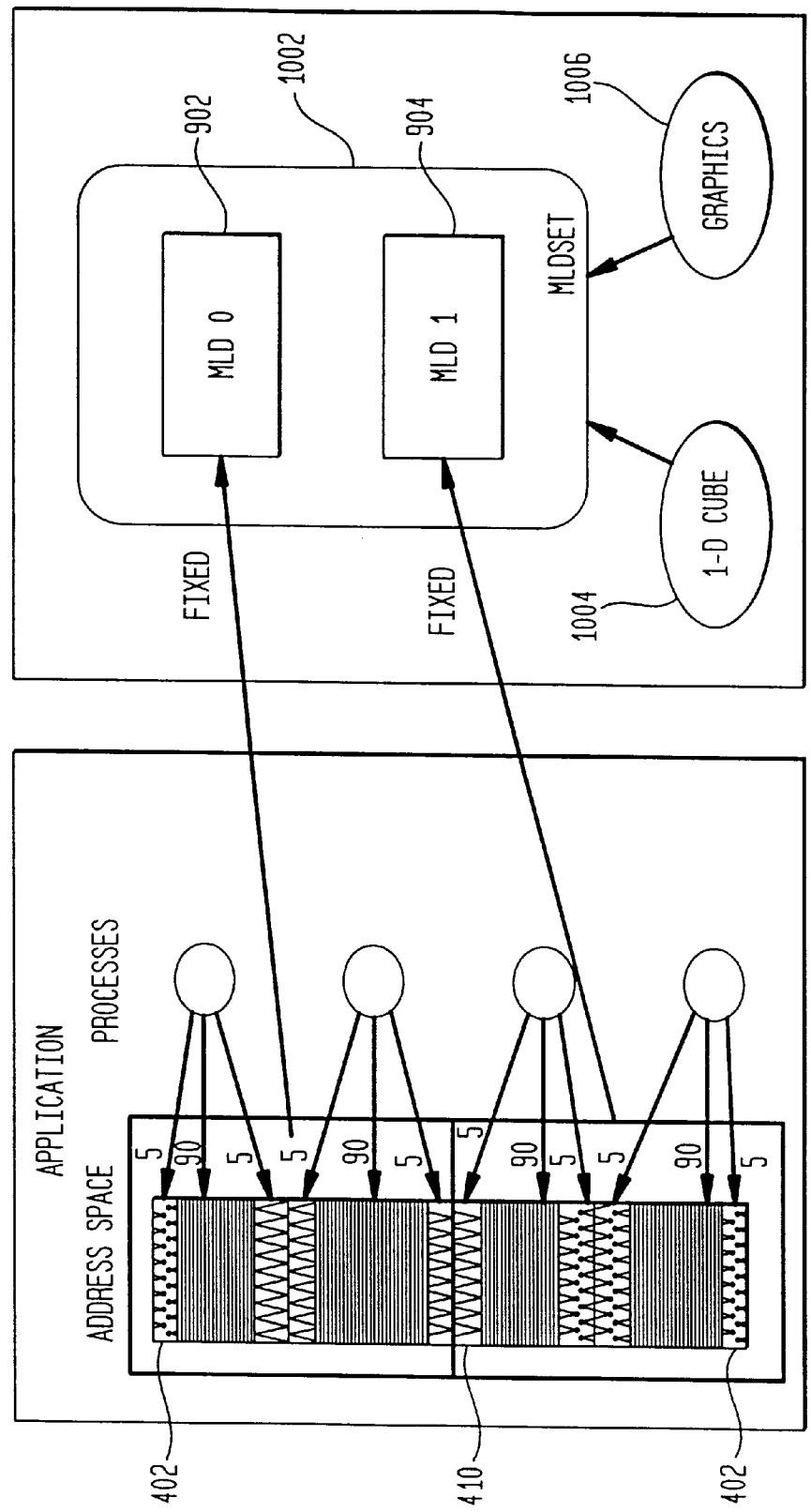
FIG. 10 is a block diagram depicting an MLDSET and an associated topology and device affinity, according to a preferred embodiment of the present invention.

Accordingly, as shown in FIG. 10, an MLDSET 1002 is created. In a preferred embodiment, an MLDSET, such as the MLDSET 1002, is a group of MLDs (such as the MLDs 902 and 904) having one or more characteristics in common. In this example, the MLDs 902 and 904 have a common characteristic in that they both share the same sections of memory, namely sections 410 and 402. Thus, as described below, the MLDs 902 and 904 are defined as the MLDSET 1002, so that local accesses are maximized.

In this example of a preferred embodiment, users can create MLDSETs using the following operating system call:

pmo_handle_t mldset_create (pmo_handle_t* mldlist, int mldlist_len);

The argument mldlist is an array of MLD handles containing all the MLDs the user wants to make part of the new MLDSET. The argument mldlist_len is the number of MLD handles in the array. On success, this call returns an MLD-SET handle.

It should be noted that in a preferred embodiment, this call only creates a basic MLDSET without any placement information. In order to have the operating system place this MLDSET, and therefore place all the MLDs that are members of this MLDSET, users typically specify the desired MLDSET topology and device affinity. Accordingly, in a preferred embodiment, topology and device affinity can be specified when placing MLDSETs. This concept is graphically depicted in FIG. 10.

In FIG. 10, the MLDSET 1002 is depicted as having an associated topology 1004 and a device affinity 1006. The associated topology 1004 is a 1-D cube topology and the device affinity 1006 is a graphics subsystem.

The 1-D cube topology 1004, associated with the MLD-SET 1002, tells the operating system to physically place the individual MLDs 902 and 904 in nodes that form a one dimensional cube topology. Preferably, other types of topologies can also be specified. Example of such other types are described below.

The graphics subsystem device affinity 1006, associated with the MLDSET 1002, tells the operating system to place the MLDSET 1002 as close as possible to the node within the multi-node system that contains the specified graphics subsystem.

In this example of a preferred embodiment, users can place MLDSETs using the following operating system call:

int mldset_place (pmo_handle_t mldset_handle,
   topology_type_t typology_type,
   raff_into_t* rafflist,
   int rafflist_len,
   rqmode_t rqmode);

The argument mldset_handle is the MLDSET handle returned by mldset_create (above), and identifies the MLD-SET the user is placing. The argument topology_type specifies the topology the operating system should consider in order to place this MLDSET. Examples of topology_types used in a preferred embodiment of the present invention include:

1. TOPOLOGY_FREE

This topology specification lets the operating system decide what shape to use to allocate the MLDSET. In a preferred implementation, the Operating system tries to place this MLDSET on a cluster of physical nodes as compact as possible, depending on the current system load.

2. TOPOLOGY_CUBE

This topology specification is used to request a cube-like shape.

3. TOPOLOGY_CUBE_FIXED

This topology specification is used to request a perfect cube.

4. TOPOLOGY_PHYSNODES

This topology specification is used to request that the MLD's in an MLDSET be placed in the exact physical nodes enumerated in the device affinity list, described below.

The topology_type_t shown below is typically defined in a header file as follows:

```
/*
* Topology types for MLDSETS
*/
typedef enum {
    TOPOLOGY_FREE,
    TOPOLOGY_CUBE,
    TOPOLOGY_CUBE_FIXED,
    TOPOLOGY_PHYSNODES,
    TOPOLOGY_LAST
} topology_type_t;
```

Referring back now to the mldset_place system call above, the argument rafflist is used to specify resource affinity. Typically, this is an array of resource specifications using a structure such as the raffstructure shown below:

```
/*
* Specification of resource affinity.
* The resource is specified via a
* file system name (dev, file, etc).
*/
typedef struct raff_into {
    void* resource;
    ushort reslen;
    ushort restype;
    ushort radius;
    ushort attr;
} raff_into_t;
```

In this example of a raff structure, the fields resource, reslen, and restype, define the resource. The field resource is used to specify the name of the resource, the field reslen is set to the actual number of bytes the resource pointer points to, and the field restype specifies the kind of resource identification being used. Preferably, values for the restype field can be as follows:

1. RAFFIDT_NAME

This resource identification type should be used for the cases where a hardware graph path name is used to identify the device.

2. RAFFIDT_FD

This resource identification type should be used for the cases where a file descriptor is being used to identify the device.

Referring back to the raff structure above, the radius field defines the maximum distance from the actual resource the user would like the MLDSET to be placed. The attr field specifies whether the user wants the MLDSET to be placed close to or far from the resource. Values for the attr field are as follows:

1. RAFFATTR_ATTRACTION

This value indicates to the operating system that the MLDSET should be placed as close as possible to the specified device

2. RAFFATTR_REPULSION

This value indicates to the operating system that the MLDSET should be placed as far as possible from the specified device.

Referring back now to the mldset_place system call above, the next argument, rafflist_len, specifies to the operating system, the number of raff structures (described above) the user is passing via rafflist. Finally, the rqmode argument is used to specify whether the placement request is ADVISORY or MANDATORY as follows:

```
/*
* Request types
*/
typedef enum {
    RQMODE_ADVISORY
    RQMODE_MANDATORY
} rqmode_t;
```

Preferably, the mldset_place call returns a non-negative integer on success. On error, it returns a negative integer.

Figure 11:
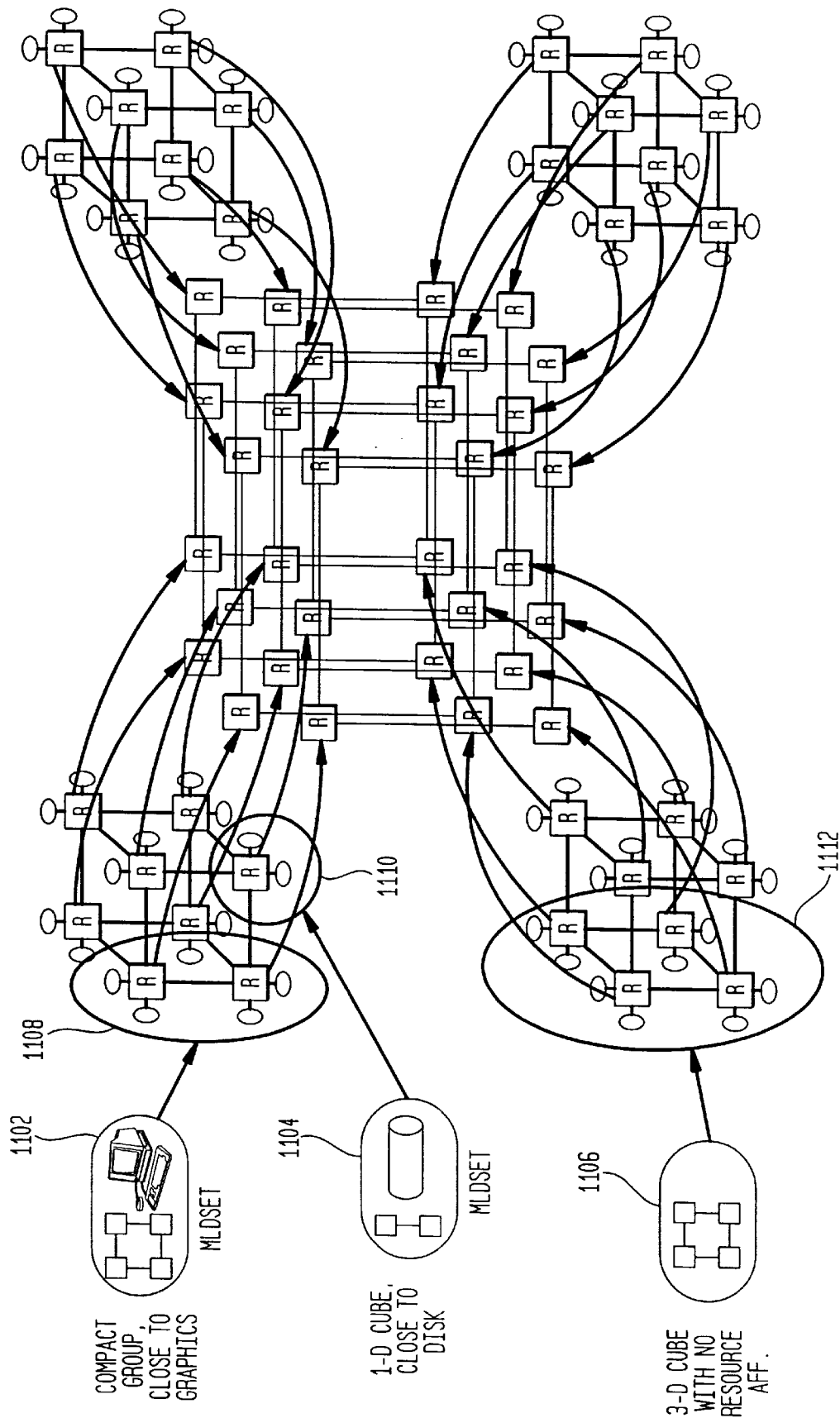
FIG. 11 depicts three examples of MLDSETs and their associated physical placements, according to a preferred embodiment of the present invention.

The operating system places the MLDSET by finding a section of the machine that meets the requirements of topology, device affinity, and expected physical memory used, as illustrated in FIG. 11.

For example, the MLDSET 1102 is an example of an MLDSET having a specified topology of TOPOLOGY_FREE and a specified device affinity that associates it with a particular graphics system. Accordingly, as described above, the operating system places the MLDSET 1102 in a compact group as close as possible to the node containing the specified graphics system. This is depicted by the nodes within the circle 1108 in FIG. 11. It is assumed the specified graphics system is coupled with one of the nodes within the circle 1108.

In a similar fashion, the MLDSET 1104 is an example of an MLDSET having a specified topology of TOPOLOGY_CUBE_FIXED and a specified device affinity associating the MLDDSET with a disk I/O system. Accordingly, as described above, the operating system places the MLDSET 1104 in a 3D cube topology, as close as possible to the node containing the specified disk system.

This is depicted by the nodes within the circle 1110 in FIG. 11.

Likewise, the MLDSET 1106 is an example of an MLDSET having a specified topology of TOPOLOGY_CUBE_FIXED and no specified device affinity. Accordingly, the operating system places the MLDSET 1104 in a cube topology as indicated by the nodes within the circle 1112.

In a preferred embodiment of the present invention, users can also destroy MLDSETS. For example, the following operating system call can be used to delete a MLDSET:

int mldset_destroy (pmo_handle_t mldset_handle);

In this example, the argument mldset_handle identifies the MLDSET to be destroyed. On success, this call returns a non-negative integer. On error it returns a negative integer.

Policy Modules

As stated, the memory management and control system of the present invention is based on the use of policy modules (PMs). PMs are used to specify and control different aspects of memory operations in the computer system including the placement policy, as described above. PMs are also used to associate sections of a threads virtual address space with particular MLDs when allocating memory from the created MLDs and MLDSETs, according to a preferred embodiment of the present invention. In general, PMs are used to specify how memory is managed for threads running in the multi-node system.

Figure 12:
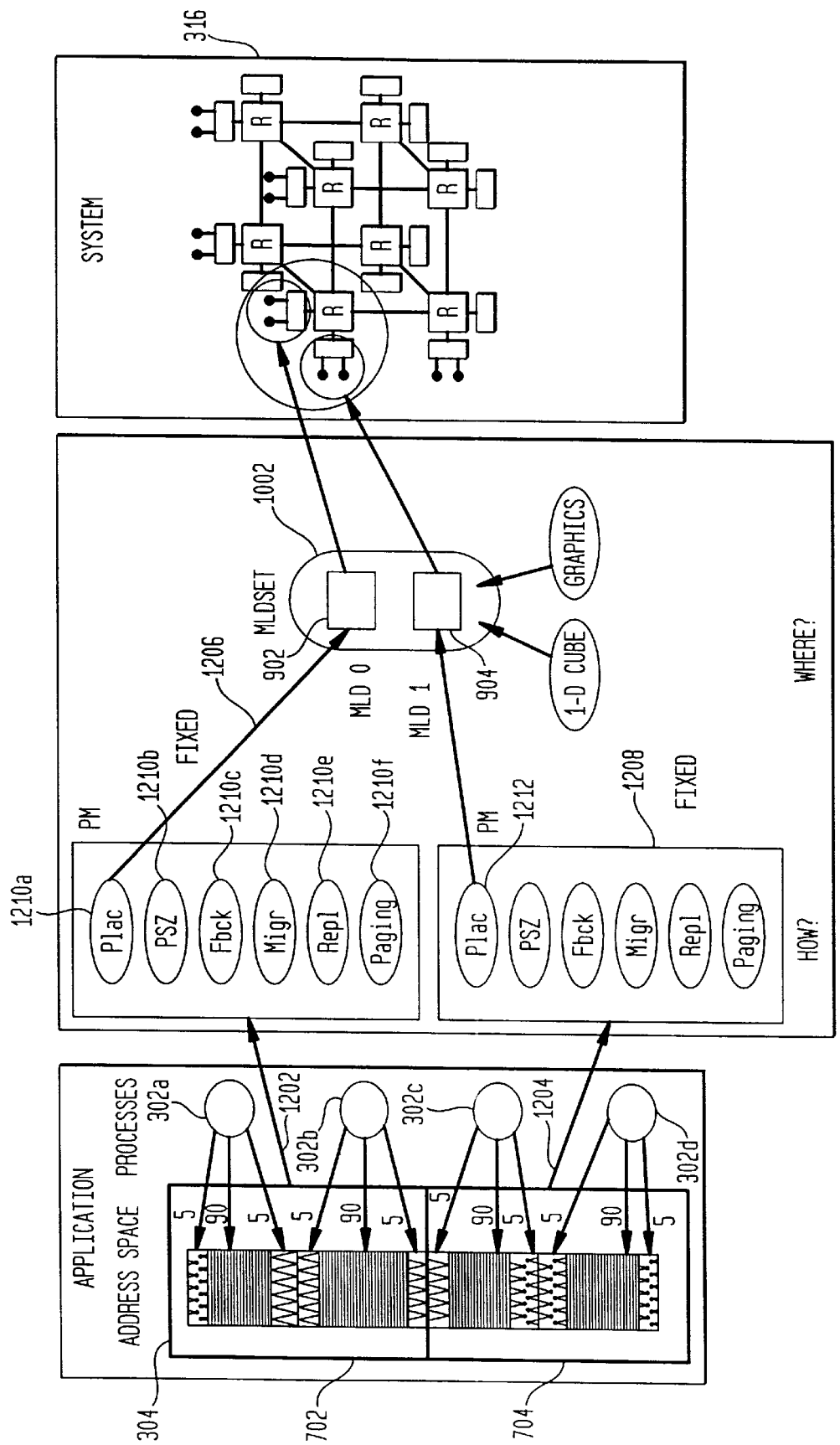
FIG. 12 is a block diagram depicting the relationships between virtual memory, policy modules, MLDs, MLDSETs and physical memory nodes, according to a preferred embodiment of the present invention.

In a preferred embodiment, different PMs are specified for particular sections of the virtual address space. For example, referring now to FIG. 12, the PM 1206 is associated with the virtual address space section 702, as depicted by the arrow 1202. Similarly, the PM 1208 is associated with the virtual address space section 704, as depicted by the arrow 1204.

Each specified PM 1206 and 1208 comprises a plurality of methods that are used to control a variety of memory operations. Such memory operations typically include initial memory placement 1210a (i.e. the placement policy, as described above), memory page size 1210b, a fall back policy 1210c, migration policy 1210d, replication policy 1210e and a paging policy 1210f.

In this manner, when the multi-node system 316 needs to execute an operation to manage a particular section of a thread's address space, the methods provided by the policies within the currently connected PM 1206 are used. For example, the methods 1210a–1210f are used by the operating system for managing memory operations associated with the memory section 702.

In a preferred embodiment, the present invention provides application programmers with the ability to select different policies for different sections of the virtual address space down to the granularity of a single memory page. In one implementation, default policies are used each time a thread begins execution. The application programmer has the option to continue using the default policies or to specify different PMs comprising different methods.

Examples of operations that are handled by the methods contained in PMs according to a preferred embodiment of the present invention are shown in Table 1 below.

TABLE 1

Operations With Selectable Policies

| OPERATION | POLICY | DESCRIPTION |
| --- | --- | --- |
| Initial Memory Allocation | Placement Policy | Determines what physical memory node to use when memory is allocated. MLDs can be specified in a placement policy. |
| | Page Size Policy | Determines what virtual page size to use to map physical memory. |
| | Fallback Policy | Determines the relative importance between placement and page size. |
| Dynamic Memory Re-location | Migration Policy | Determines the aggressiveness of migration. |
| | Replication Policy | Determines the aggressiveness of replication. |
| Paging | Paging Policy | Determines the memory stealing and faulting modes and aggressiveness. |

As stated, when the operating system needs to execute an operation to manage a section of a thread's address space, it uses the methods provided by the policies specified by the PM that is connected or attached (described below) to that virtual address space section.

For example, to allocate a physical page, a physical memory allocator calls the method provided by the placement policy, which determines where the page should be allocated from. Preferably, this method returns a pointer to the physical memory page where the memory is allocated. Some examples of selectable placement policies are as follows:

1. First Touch Policy: the page comes from the node where the allocation is taking place;
2. Fixed Policy: the page comes from a predetermined node or set of nodes;
3. RoundRobin Policy: the source node is selected from a predetermined set of nodes following a round-robin algorithm.

Of particular importance is the Fixed Policy (item number 2 above). Using this type of placement policy, a user can specify particular nodes in which a page of memory is to be allocated from. In this example, users specify a previously created MLD, so that the physical node associated with the specified MLD is used to allocate memory from whenever this policy module is referenced.

The physical memory allocator preferably determines the page size to be used for the current allocation. This page size is acquired using a method provided by the pagesize policy. Once this is determined, the physical memory allocator calls a per-node memory allocator specifying both the source node and the page size. If the memory allocator finds memory on this node that meets the page size requirement, the allocation operation finishes successfully. If not, the operation fails and a fallback method from the fallback policy is preferably called. The fallback method provided by this policy decides whether to try the same page on a different node, a smaller page size on the same source node, sleep, or just fail.

Typically, the selection of a fallback policy depends on the kind of memory access patterns an application exhibits. If the application tends to generate a lot of cache misses, giving locality precedence over the page size may make sense; otherwise, specially if the application's working set is large, but has reasonable cache behavior, giving the page size higher precedence may be preferable.

Preferably, once a page is placed, it stays on its source node until it is either migrated to a different node, or paged out and faulted back in. Migratability of a page is determined by the migration policy. For some applications, for example, those that present a very uniform memory access pattern, initial placement may be sufficient and migration can be turned off. On the other hand, applications with phase changes can benefit from some level of dynamic migration, which has the effect of attracting memory to the nodes where it is being used.

Some types of data, for example, read-only text, can also be replicated. The degree of replication of text is determined by the replication policy. Text shared by multiple threads running on different nodes may benefit substantially from several replicas which both provide high locality and minimize interconnect contention. For example, frequently used programs such as "/bin/sh", may be a good candidate to replicate on several nodes, whereas less used programs such as "/bin/bc" may not need much replication at all.

Finally, all paging activity is preferably controlled by the paging policy. When a page is about to be evicted, the pager uses the paging policy methods in the corresponding PM to determine whether the page can really be stolen or not.

In this example of a preferred embodiment, users create policy modules by using the following operating system call:

```
include <sys/pmo.h>
typedef struct policy_set {
        char* placement_policy_name;
```

-continued

```
        void*  placement_policy_args;
        char*  fallback_policy_name;
        void*  fallback_policy_args;
        char*  replication_policy_name;
        void*  replication_policy_args;
        char*  migration_policy_name;
        void*  migration_policy_args;
        char*  paging_policy_name;
        void*  paging_policy_args;
        size_t page_size;
        int    policy_flags;
} policy_set_t;
pmo_handle_t pm_create(policy_set_t* policy_set);
```

In this example, the policy_set_t structure contains all the data required to create a Policy Module. For each selectable policy listed in Table 1 above, this structure contains a field to specify the name of the selected policy and the list of possible arguments that the selected policy may require. The page size policy is the exception, for which the specification of the wanted page size suffices. The policy_flags field allows users to specify special behaviors that apply to all the policies that define a Policy Module. For example, the policy_flags field can be used to specify that the Policy Module should always pay more attention to the cache coloring rather than locality.

An example of values that can be used to define the policy_set structure is as follows:

policy_set.placement_policy_name = "PlacementFixed";

policy_set.placement_policy_args=MLD;

policy_set.recovery_policy_name="RecoveryDefault";

policy_set.recovery-policy_args=NULL' policy_set.replication_policy-name = "ReplicationDefault";

policy_set.replication_policy_args=NULL;

policy_set.migration_policy_name = "MigrationDefault";

policy_set.migration_policy_args=NULL;

policy_set.paging_policy_NAME="Paging Default";

policy_set.paging_policy>args=NULL;

policy_set.page_size=PM_PAGESZ_DEFAULT;

policy_set.policy_flags=POLICY_CACHE_COLOR_FIRST;

Note that in this example, a user defines the policy_set_t structure to create a PM with a placement policy called "PlacementFixed". As described above, the PlacementFixed policy in this example, takes a particular MLD as an argument. Thus, whenever the application allocates memory using the policy module, it is allocated from the physical node associated with the specified MLD.

As can be seen by the above example, all other policies are set to the default policies, including the page size. In addition, in this example, the user has specified (by the policy_flags field) that cache coloring should be given precedence over locality.

Because it is typical to define the policy_set structure with many default values as shown above, a typical implementation of the present invention provides the user with a shorthand call that pre-fill the structure with default values. An example of such a call is as follows:

void pm_filldefault (policy_set_t* policy_set);

The pm_create call returns a handle to the Policy Module just created, or a negative long integer in case of error, in which case errno is set to the corresponding error code.

The handle returned by pm_create is of type pmo_handle_t. The acronym PMO standards for Policy Management Object. This type is common for all handles returned by all the Memory Management Control Interface calls. These handles are used to identify the different memory control objects created for an address space, much in the same way as file descriptions are used to identify open files or devices. Every address space contains one independent PMO table. A new table is created only when a process execs.

In a preferred embodiment, a simpler way to create a Policy Module should be provided. For example, a restricted Policy Module creation call can be provided as follows:

pmo_handle_t pm_creates_simple (char* place_name,
                                void* plac_args,
                                char* repl_name,
                                void* repl_args,
                                size_t page_size);

In this example, the call to pm_create_simple allows for the specification of only the Placement Policy, the Replication Policy and the Page Size. Defaults are automatically chosen for the Fallback Policy, the Migration Policy, and the Paging Policy.

Typical List of Available Policies for a Preferred Embodiment

In a preferred embodiment of the present invention, The current list of available policies is shown in Table 1-1.

TABLE 2

Typical available policies

| POLICY TYPE | POLICY NAME | ARGUMENTS |
| --- | --- | --- |
| Placement Policy | Placement Default | Number of Threads |
| | Placement Fixed | Memory Locality Domain |
| | Placement First Touch | No Arguments |
| | Placement Round Robin | RoundRobin MLDSET |
| | Placement Thread Local | Application MLDSET |
| Fallback Policy | Fallback Default | No Arguments |
| | Fallback Language | No Arguments |
| Replication Policy | Replication Default | No Arguments |
| | Replication One | No Arguments |
| Migration Policy | Migration Default | No Arguments |
| | Migration Control | Migration Parameters (migr_policy_uparms_t) |
| Paging Policy | Paging Default | No Arguments |

Note that in this example, there are five placement policies that a user may select. As stated the placement policy determines how memory is allocated for a given process. For example, the PlacementFixed policy allows a user to specify a previously created MLD. In this fashion, memory pages that are allocated using this placement policy will be allocated from the physical node corresponding to the specified MLD.

The PlacementRoundRobin policy in this example accepts an MLDSET as an argument. In this fashion, memory pages allocated using this placement policy will be allocated from the physical nodes corresponding with the MLDs comprising the specified MLDSET. In this example, memory is placed in each MLD in a round robin fashion.

The PlacementThreadLocal policy in this example, also accepts an MLDSET as an argument. However, in this example, the operating system allocates memory from a physical node that is local (or as close as possible) to the thread making the allocation request. In this fashion, a user can assure that local accesses are maximized even if the memory access patterns for a particular application is not precisely known.

For example, referring back to FIG. 7, because the user has advanced knowledge of the memory access patterns for the application 306, two policy modules 1206 and 1208 are created. In this example, the placement policy for each policy module is the PlacementFixed 1210a and 1212, as described above. Thus, the first PM 1206 is associated with MLD 902 and the second PM is associated with the MLD 904.

However, in a typical example, a user may not have advanced knowledge of the memory access patterns, such as shown in FIG. 7. In this case, the user can create a single PM comprising a PlacementThreadLocal placement policy. The single PM can be attached (described below) to the entire range of the viral address space 304. Accordingly, because of the PlacementThreadLocal placement policy, when each thread allocates a page of memory, it will be allocated from the same node that the thread is running. In this fashion, local accesses are maximized automatically by the operating system.

Association of Virtual Address Space Sections to Policy Modules

As stated, preferably, the present invention provides a means to allow users to select different policies for different sections of a virtual address space, down to the granularity of a page. To associate a virtual address space section with a set of policies, users create a Policy Module as described above. After a PM is created, users specify an operating system call to attach the PM to a particular virtual address space. An example of such an operating system call that can be used in a preferred embodiment is as follows:

int pm_attach(pmo_handle_t pm_handle, void* base_addr, size_t length);

The pm_handle identifies the Policy Module the user has previously created, base_addr is the base virtual address of the virtual address space section the user wants to associate to the set of policies, and length is the length of the section.

For example, referring back to FIG. 12, the base_addr and length parameters define the section of virtual address space 702, and the pm_handle identifies the PM 1206. Thus, by using the above call, the PM 1206 is attached or connected to the section of virtual address space 702.

Linking Execution Threads to MLDs

Preferably, users need to make sure that the application threads, such as the thread 302a, will be executed on or near the node where the associated memory is to be allocated, according to the MLD and MLDSET definitions as described above. For example, referring to FIG. 12, the threads 302a and 302b are linked to MLD 902. Likewise, the threads 302c and 302d are linked to the MLD 904.

An example of an operating system call that can be used to perform this function is as follows:

int process_mldlink (pid_t pid, pmo_handle_t mid_handle);

In this example, the argument pid is the process identification of the process, such as the thread 302a, and the mld_handle identifies the MLD, such as MLD 902 to be linked. In the above example shown in FIG. 12, this function is preferably called 4 times to perform the functions as follows: (1) link the thread 302a to the MLD 902; (2) link the thread 302b to the MLD 904; (3) link the thread 302c to the MLD 904; and (4) link the thread 302d to the MLD 906. On success this call return a non-negative integer. On error it returns a negative integer.

Figure 13:
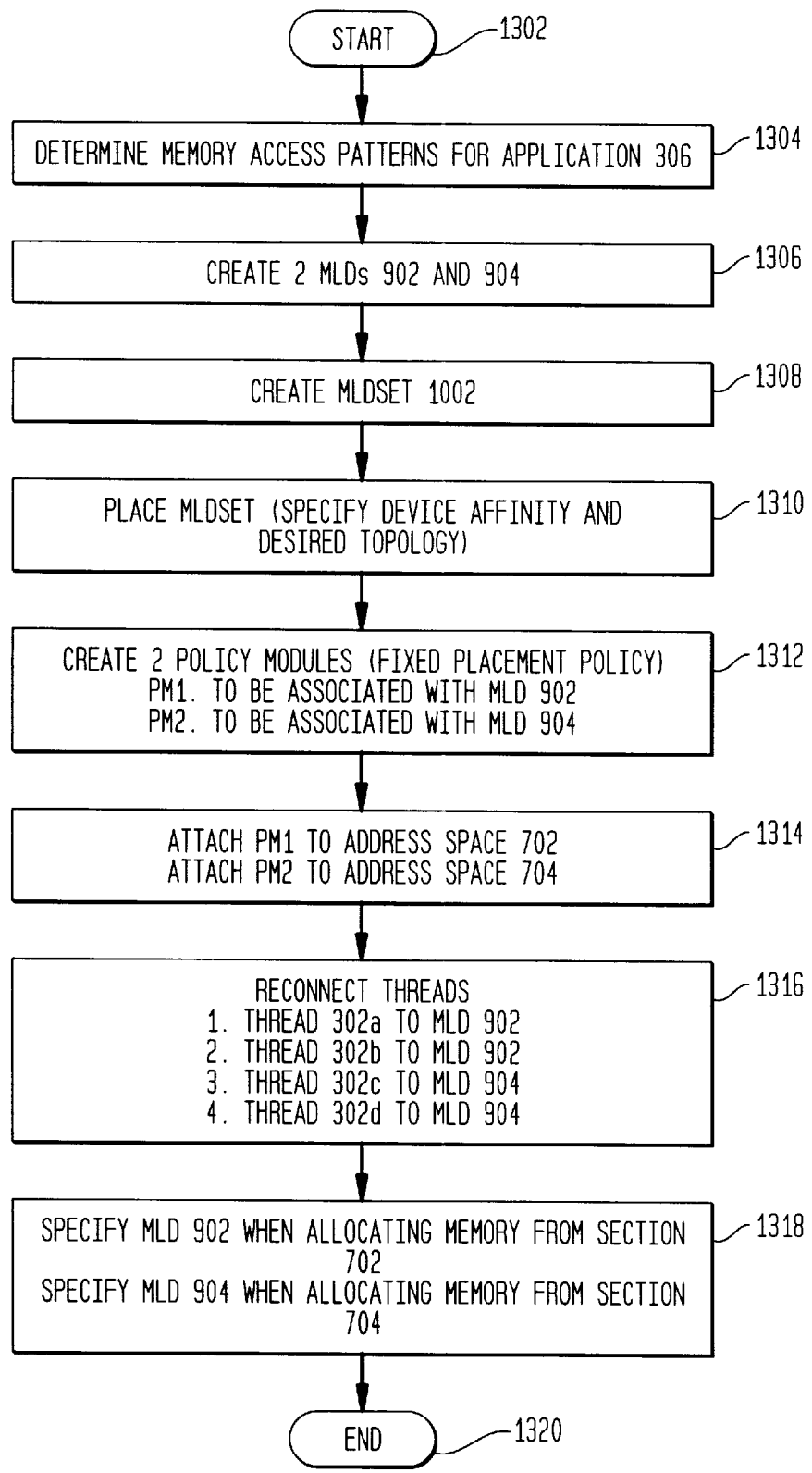
FIG. 13 is a flowchart depicting a process that can be used to specify initial memory placement using MLDs and MLDSETs according to a preferred embodiment of the present invention.

FIG. 13 is a flowchart depicting a process that can be used to specify initial memory placement using MLDs and MLD-SETs according to a preferred embodiment of the present invention. The example used in the flowchart in FIG. 13 applies to the memory access pattern for the application 306 shown in FIG. 3.

The process begins with step 1302, where control immediately passes to step 1304. In step 1304 the user or application programmer determines the memory access pattern for each of the threads 302a–302d in the application 306, as shown in FIG. 3. Once the memory access patterns are determined, control passes to step 1306.

In step 1306, the user creates 2 MLDs 902 and 904. This can be accomplished for example, by using the example operating system call mid_create, as described above. Alternatively, other methods may be used to create the two MLDs 902 and 904, as described below.

Next, in step 1308, an MLDSET 1002 is created. This can be accomplished for example, by using the example operating system call mldset_create, as described above. Alternatively, other methods may be used to create the MLDSET 1002, as described below. Once the MLDSET is created, control passes to step 1310.

In step 1310, the MLDSET 1002 created in step 1308 is placed. This can be accomplished for example, by using the example operating system call mldset_place, as described above. It should be recalled that when placing MLDSETs, such as the MLDSET 1002, a desired topology for the MLDs and a desired device affinity can be specified. Alternatively, other methods may be used to place the MLDSET 1002, as described below. Once the MLDSET is placed created, control passes to step 1312.

In step 1312, two policy modules are created. This can be accomplished for example, by using the example operating system call pm_create. In this example, two policy modules are created. The first one associated with the first MLD 902 and the second one is associated with the MLD 904. In this example a fixed placement policy is used, but as noted above, other placement policy types can be specified. Two examples of other types of placement policies that can be used are round robin placement policy and thread local placement policy, as described above.

In addition, alternative methods may be used to create policy modules. Further, methods other than using policy modules can be used to associate MLDs with a thread's virtual address space. Such methods, other than those described in the present disclosure would be apparent to those persons skilled in the relevant art(s). Once 2 PMs are created, control passes to step 1314.

In step 1314, the two policy modules that were created in step 1312 are attached or connected to a particular section of the application's virtual address space 304. This can be accomplished for example, by using the example operating system call pm_attach. Other methods can also be used to accomplish this function. Once the policy modules are attached, control passes to step 1316.

In step 1316, each of the 4 threads 302a–302d comprising the application 306 are reconnected to the center node C of their associated MLD. The term "reconnected" is used in this instance because in a typical implementation, the threads 302a–302d are already running on particular nodes within the multi-node computer system. Once steps 1302–1314 are performed, these running threads are now be relocated to different nodes in order to maximize local accesses.

Typically, the ideal node is the center node defined for the associated MLD. Thus, the threads 302a and 302b are reconnected to the center node of the MLD 902. Similarly, the center node of the MLD 302c and 302d are reconnected to the threads 904. This can be accomplished, for example, by using the example operating system call process_Mldlink described above. Other methods can also be used to accomplish this task. Once the threads are reconnected to their optimal nodes, control passes to step 1318.

In step 1318, the user specifies that the virtual node MLD 902, which is now mapped to a physical node according to the specified criteria as described above, is to be used for allocating memory pages associated with the virtual address in section 702. Likewise, the user specifies that the virtual node MLD 904, which is now mapped to a physical node according to the specified criteria as described above, is to be used for allocating memory pages associated with the virtual address in section 704. The process ends as indicated by step 1320.

Methods other than the example operating system calls can be used to control the memory placement parameters according to a preferred embodiment of the present invention. For example, as stated above, the present invention can be implemented not only with direct operating system calls, but with high level programming tools, compiler directives, and the like. For example, in one embodiment, placement specifications are described in placement files or invoked from the command language library. For example, a placement specification may contain descriptions from memory and thread placement according to the principles described in the present disclosure. Memory topologies as well as affinities to devices may also be specified. In this fashion, shared virtual address ranges can be mapped to a specified memory. In addition page size and page migration thresholds can also be controlled in this fashion.

An example of a high level tool that can be used to provide users with a means to specify placement information according to a preferred embodiment of the present invention is referred to as 'dplace'. As stated, this type of high level tool is an alternative to using the operating system calls as described above to specify placement information. The following description relates to an exemplary tool referred to as dplace, which is shipped with the Cellular IRIX™ operating system manufactured by Silicon Graphics Incorporated. The following description is in the form of manual pages or Man Pages, which are used to provide information about system calls and library functions and the like for UNIX operating systems. The following descriptions are self explanatory and would be apparent to persons skilled in the relevant art(s).

NAME dplace—NUMA placement specification

DESCRIPTION

Placement specifications are described in placement files or invoked from the command language library. A valid placement specification contains descriptions for memory and thread placement. Memory topologies as well as affinities to devices may also be specified. Shared virtual address ranges can be mapped to a specified memory. Page size and page migration thresholds can also be controlled.

EXAMPLE

An example placement file describing two memories and two threads might look like:

placement specification file
set up 2 memories which are close
memories 2 In topology cube
set up 2 threads
threads 2
run the first thread on the second memory
run thread 0 on memory 1
run the second thread on the first memory run thread 1 on memory 0

This specification, when used for initial placement, would request two nearby memories from the operating system. At creation, the threads are requested to run on an available CPU which is local to the specified memory. As data and stack space is "touched" or faulted in, physical memory is allocated from the memory that is local to the thread that initiates fault.

SUMMARY

The example commands above are newline terminated.

Characters following the comment delimiter '#' are ignored.

Tokens are separated by optional white space which is ignored.

Line continuation is a \, and must occur between tokens.

In what follows k l,m,n,t0,tl,dt,m0,m and ml are arithmetic expressions that can contain environment variables preceded by a '$'.

A legal statement could be:

memories ($MP-SET-NUMTHREADS +1)/2 in cube

The first example can be written in a scalable fashion as follows:

scalable placement specification file
set up memories which are close
memories $MP-SET-NUMTHREADS in topology cube
set up threads
threads $MP-SET-NUMTHREADS
run reversed threads across the memories
distribute threads $MP-SET-NUMTHREADS-1:0:-1 across memories Static specifications may occur in a placement file or be called later from dplace(3) library routines. Dynamic specifications may only be called from dplace(3) library routines. Here is a summary of the grammar.

Static specifications:

memories m [[in] [topology] cube|none|physical][near [/hw/*]+]
threads n
run thread n on memory m [using cpu k]
distribute threads [t0:t1[:dt] across memories [m0:ml [:dm]] [block [m]][cyclic [n]]
place range k to 1 on memory m [[with] pagesize n [k|K]]
policy stack|data|text pagesize n [k|K]
policy migration n [%]
mode verbose [on|off|toggle]

Dynamic specifications:

migrate range k to 1 to memory m
move thread|pid n to memory m

In the above, the specification: threads t0:tl[:dt] means to use threads numbered t0 through t1 with an optional stride of dt. The default stride value is 1.

Similarly, the specification: memories [m1:ml[:dm]] means to use memories m0 through ml with an optional stride of dm. The default stride value is 1.

The qualifier block m implies a block distribution of the threads with at most m threads per memory. If m is omitted, its default value is: the integer floor of the number of threads being distributed divided by the number of memories being distributed across.

The qualifier cyclic n implies a cyclic distribution of the selected threads across the selected memories. The threads are chosen in groups of n and dealt out to the appropriate memory until all threads are used. If n is omitted, its default value is one and the threads are dealt out to the memories like a deck of cards.

COMMON PLACEMENT FILE ERRORS

The most common placement file error is the use of either the run or distribute directive without previously declaring both the number of threads, and the number of memories using the memories and threads directives.

TERMINOLOGY

In the above, a thread is an IRIX process or any of it's descendants which were created using sproc(2) or fork(2). Thread numbers are ordered (from 0 to the number of threads minus 1) in the same way as the pid's for each process.

A memory is an instantiation of a physical memory.

A range is a virtual address range such as OxIO0000 to 0x2OOOOO.

SEE ALSO dplace(1), dplace(3)

NAME dplace_file, dplace_line, lib_dplace—a library interface to dplace

C SYNOPSIS void dplace_file(char *filename);

void dplace_line(char *line);

FORTRAN SYNOPSIS

CHARACTER*N string

CALL dplace_file(string)

CALL dplace_line(string)

DESCRIPTION

These library routines provide high level access to a subset of the memory management and control mechanisms of IRIX. Dynamic dplace(1) functionality is provided from within a users program. The first form takes a filename as an argument and all commands within the file are processed. The second form operates on a single command. Errors are handled in the same way as dplace(1); the program exits and a diagnostic message is printed to standard error. The library can be used with or without using dplace(1).

EXAMPLE CODE

The following is a fragment of FORTRAN code

```
CHARACTER*128 s
np=mp_numthreads()
WRITE(s,*) 'memories',np,'in cube'
CALL dplace_line(s)
WRITE(s,*) 'threads',np
CALL dplace_line(s)
DO i=O, np-1
   WRITE(s,*) 'run thread, i,'on memory',i
   CALL dplace_line(s)
   head=%loc(a(1+i*(n/np)))
   tail=%loc(a((i+1)*(n/np)))
   WRITE(s,*) 'place range',head,'to',tail,'on memory',i
   CALL dplace_line(s)
END DO
DO I=O, np-1
   WRITE(s,*) 'move thread',i,'to memory',np-l-i
   CALL dplace_line(s)
END DO
DO i=O, np-1
   head=%loc(a(1+i*(n/np)))
   tail=%loc(a((i+1)*(n/np)))
   WRITE(s,*) 'migrate range',head,'to',tail,'to memory',np-1-i
```

```
   CALL dplace_line(s)
END DO
```

The following is a C language code fragment:

```
main() {/* C example code*/
   ...
   dplace_file("initial_placement_file");
   ...
   data initialization,sprocs etc.
   ...
   for(i=0; i<nthreads; i++){
           sprintf(cmd,"run thread %d on memory %d\n", i, i/2);
   dplace_line(cmd);
   ...
   sprintf(cmd,"migrate range %d to %d to memory %d\n"
   ,&a[i*size],&a[(i+1)size-1],i/2);
   dplace_line(cmd);
   ...
   }
}
```

When linking C or FORTRAN programs, the flag -idplace will automatically invokes the correct lib_dplace library,

FILES

/usr/lib/libdplace.so

/usr/lib64/libdplace.so

/usr/lib32/libdplace.so

DEPENDENCIES

These procedures are only available on NUMA systems. In order to avoid conflicts with Fortran's libmp, it is advisable to set the environment variable _DSM_OFF to disable libmp's NUMA functionality before running programs that are linked with lib_dplace.

SEE ALSO dplace(1), dplace(5)

NAME dplace—a NUMA memory placement tool

SYNOPSIS dplace [-placeplacement-file]

[-data_pagesize n-bytes]

[-stack-pagesize n-bytes]

[-text_pagesize n-bytes]

[-migration threshold]

[-propagate]

[-mustrun]

[-v[erbose]]

program [program-arguments]

DESCRIPTION

The given program is executed after placement policies are set up according to command line arguments and the specifications described in placement_file.

OPTIONS

_placeplacement-file

Placement information is read from placement-file. If this argument is omitted, no input file is read. See dplace (5) for correct placement file format.

—data-pagesize n-bytes

Data and heap page sizes will be of size n-bytes. Valid page sizes are 16k multiplied by a non-negative integer powers of 4 up to a maximum size of 16 m. Valid page sizes are 16 k, 64 k, 256 k, 1 m, 4 m, and 16 m.

—stack-Pagesize n-bytes

Stack page sizes will be of size n-bytes. Valid page sizes are 16 k multiplied by a non-negative integer powers of 4 up to a maximum size of 16 m. Valid page sizes are 16 k, 64 k, 256 k, 1 m, 4 m, and 16 m.

—text_pagesize n-bytes

Text page sizes will be of size n-bytes. Valid page sizes are 16 k multiplied by a non-negative integer powers of 4 up to a maximum size of 16 m. Valid page sizes are 16 k, 64 k, 256 k, 1 m, 4 m, and 16 m.

—migration threshold

Page migration threshold is set to threshold. This value specifies the maximum percentage difference between the number of remote memory accesses and local memory accesses (relative to maximum counter values) for a given page, before a migration request event occurs. A special argument of 0 will turn page migration off.

—propagate

Migration and page size information will be inherited by descendants which are exec'ed.

—mustrun

When threads are attached to memories or CPUs they are run mandatorily.

—verbose or -v

Detailed diagnostic information is written to standard error.

EXAMPLE

To place data according to the file placement_file for the executable a.out that would normally be run by:

% a.out <in>out a user would write:

% dplace-place placement-file a.out <in>out.

The following is an example placement file placement-file when a.out is two threaded:

| # placement-file | |
|---|---|
| memories 2 in topology cube | # set up 2 memories which are close |
| threads 2 | # number of threads |
| run thread 0 on memory 1 | # run the first thread on the second memory |
| run thread 1 on memory 0 | # run the second thread on the first memory |

This specification, would request 2 nearby memories from the operating system. At creation, the threads are requested to run on an available CPU which is local to the specified memory. As data and stack space is touched or faulted in, physical memory is allocated from the memory which is local to the thread which initiated the fault.

This can be written in a scalable way for a variable number of threads using the environment variable NP as follows:

| # scalable placement_file | |
|---|---|
| memories $NP in topology cube | # set up memories which are close |
| threads $NP | # number of threads |
| # run the last thread on the first memory etc. | |
| distribute threads $NP-1:0:-1 across memories | |

USING MPI

Since most MPI implementations use $MPI_NP+1 threads; where the first thread is mainly inactive. One might use the placement file:

| # scalable placement_file for MPI | |
|---|---|
| memories ($MPI_NP + 1)/2 in topology cube | # set up memories which are close |
| threads $MPI_NP + 1 | # number of threads |
| # ignore the lazy thread | |
| distribute threads 1:$MPI-NP across memories | |

When using MPI with dplace, users should set MPI_NP to the appropriate number of threads and run their dynamic executable directly from dplace; do not use mpirun.

LARGE PAGES

Some applications run more efficiently using large pages, To run a program a.out utilizing 64 k pages for both stack and data, a placement file is not necessary. One need only invoke the command:

dplace-data_pagesize 64 k-stack_Pagesize 64 k a.out from the shell.

PHYSICAL PLACEMENT

Physical placement can also be accomplished using dplace. The following placement file:

physical placement—file for 3 specific memories and 6 threads memories 3 in topology physical near\
/hw/module/2/slot/n4/node\
/hw/module13/slottn2tnode
/hw/module/4/slot/n3/node threads 6 the first two threads (0 & 1) will run on /hw/module/2/slot/n4/node the second two threads (2 & 3) will run on /hw/module/3/slot/n2/node the last two threads (4 & 5) will run on /hw/module/4/slot/n3/node distribute threads across memories specifies three physical nodes using the proper /hw path. To find out the names of the memory nodes on the machine you are using, type "find /hw -name node -print" at the shell command prompt.

DEFAULTS

If command line arguments are omitted, dplace chooses the following set of defaults:

| place | /dev/null |
|---|---|
| data-pagesize | 16k |
| stack-pagesize | 16k |
| text-Pagesize | 16k |
| migration | Off |
| propagate | Off |
| mustrun | Off |
| verbose | Off |

RESTRICTIONS

Programs must be dynamic executables; non shared executables behavior are unaffected by dplace. Placement files will only affect direct descendants of dplace. Parallel applications must be based on the sproc(2) or fork(2) mechanism.

ENVIRONMENT

Dplace recognizes and uses the environment variables PAGESIZE_DATA, PAGESIZE_STACK and PAGESIZE_TEXT. When using these variables it is important to note that the units are in kilobytes. The command line option will override environment variable setting.

ERRORS

If errors are encountered in the placement file, dplace will print a diagnostic message to standard error specifying where the error occurred in the placement file and abort execution.

SEE ALSO dplace(5), dplace(3)

In another embodiment, compiler directives can be used to specify placement information according to a preferred embodiment of the present invention. For an example of compiler directives that can be used to specify memory placement information, please refer to "*A MIPSpro Power Fortran 90 Programmer's Guide*"(007-2760-001). This publication is included with the Cellular IRIX® 6.4 operating system, manufactured by Silicon Graphics Incorporated. This publication can also be found on Silicon Graphic's Web site, www.SGI.com.

Figure 14:
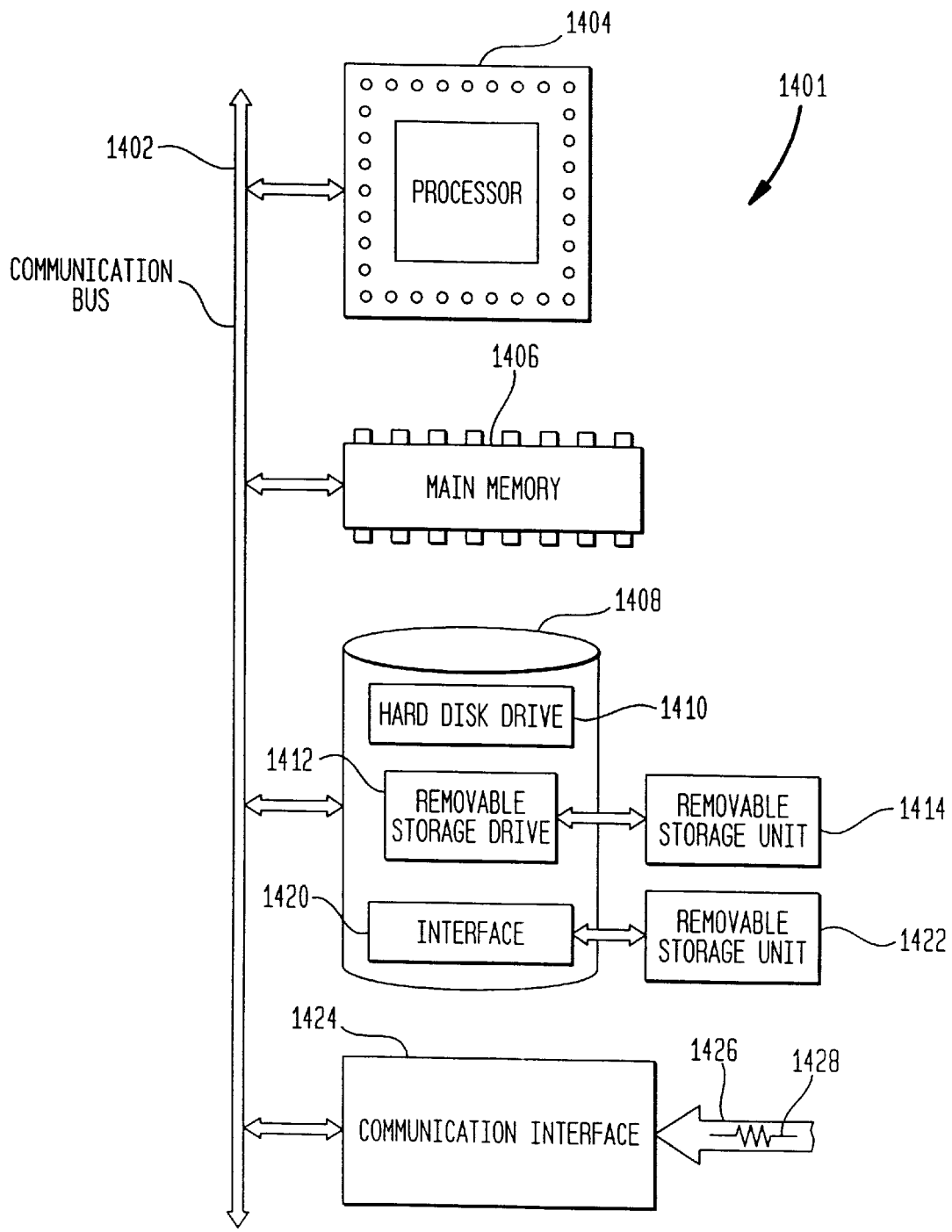
FIG. 14 is a block diagram of a computer that can be used to implement components of the present invention.

The present invention may be implemented using hardware, firmware, software or a combination thereof and may be implemented in a computer system or other processing system. In fact, in one embodiment, the invention is directed toward a computer system capable of carrying out the functionality described herein. An example computer system 1401 is shown in FIG. 14. The computer system 1401 includes one or more processors, such as processor 1404. The processor 1404 is connected to a communication bus 1402. Various software embodiments are described in terms of this example computer system. After reading this description, it will become apparent to a person skilled in the relevant art how to implement the invention using other computer systems and/or computer architectures.

Computer system 1402 also includes a main memory 1406, preferably random access memory (RAM), and can also include a secondary memory 1408. The secondary memory 1408 can include, for example, a hard disk drive 1410 and/or a removable storage drive 1412, representing a floppy disk drive, a magnetic tape drive, an optical disk drive, etc. The removable storage drive 1412 reads from and/or writes to a removable storage unit 1414 in a well known manner. Removable storage unit 1414, represents a floppy disk, magnetic tape, optical disk, etc. which is read by and written to by removable storage drive 1412. As will be appreciated, the removable storage unit 1414 includes a computer usable storage medium having stored therein computer software and/or data.

In alternative embodiments, secondary memory 1408 may include other similar means for allowing computer programs or other instructions to be loaded into computer system 1401. Such means can include, for example, a removable storage unit 1422 and an interface 1420. Examples of such can include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1401.

Computer system 1401 can also include a communications interface 1424. Communications interface 1424 allows software and data to be transferred between computer system 1401 and external devices. Examples of communications interface 1424 can include a modem, a network interface (such as an Ethernet card), a communications port, a PCMCIA slot and card, etc. Software and data transferred via communications interface 1424 are in the form of signals which can be electronic, electromagnetic, optical or other signals capable of being received by communications interface 1424. These signals 1426 are provided to communications interface via a channel 1428. This channel 1428 carries signals 1426 and can be implemented using wire or cable, fiber optics, a phone line, a cellular phone link, an RF link and other communications channels.

In this document, the terms "computer program medium" and "computer usable medium" are used to generally refer to media such as removable storage device 1412, a hard disk installed in hard disk drive 1410, and signals 1426. These computer program products are means for providing software to computer system 1401.

Computer programs (also called computer control logic) are stored in main memory and/or secondary memor 1408. Computer programs can also be received via communications interface 1424. Such computer programs, when executed, enable the computer system 1401 to perform the features of the present invention as discussed herein. In particular, the computer programs, when executed, enable the processor 1404 to perform the features of the present invention. Accordingly, such computer programs represent controllers of the computer system 1401.

In an embodiment where the invention is implemented using software, the software may be stored in a computer program product and loaded into computer system 801 using removable storage drive 1412, hard drive 1410 or communications interface 1424. The control logic (software), when executed by the processor 1404, causes the processor 1404 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for memory management in a distributed shared memory multi-node computer system capable of executing a plurality of applications, each comprising one or more threads and having a virtual address space that is shared among the threads, the method comprising the steps of:

creating a policy module associated with an application;

attaching the policy module to a section of the application's virtual address space; and using the policy module for memory management operations that are related to the section of the application's virtual address space;

wherein said step of creating a policy module includes the step of specifying a plurality of methods related to the memory management operations;

wherein said step of specifying a plurality of methods includes one or more of the following steps:

selecting a placement policy;

selecting a replication policy;

selecting a migration policy;

selecting a paging policy;

selecting a recovery policy;

selecting a page size; and selecting a policy flag.

2. A system for memory management in a distributed shared memory multi-node computer system capable of executing a plurality of applications, each comprising one or more threads and having a virtual address space that is shared among the threads, said system comprising:

means for creating a policy module associated with the application;

means for attaching said policy module to a section of the application's virtual address space; and means for using said policy module for memory management operations that are related to said section of the application's virtual address space;

wherein said means for creating a policy module includes means for specifying a plurality of methods related to said memory management operations;

wherein said means for specifying a plurality of methods includes any combination of:

means for selecting a placement policy;
means for selecting a replication policy;
means for selecting a migration policy;
means for selecting a paging policy;
means for specifying a page size; and
means for specifying a policy flag.

3. A computer program product comprising a computer useable medium having computer program logic stored therein, said computer program logic for memory management in a distributed shared memory multi-node computer system capable of executing a plurality of applications, each comprising one or more threads and having a virtual address space that is shared among the threads, wherein said computer program logic comprises:

means for enabling the computer to create a policy module associated with the application;

means for enabling the computer to attach said policy module to a section of the application's virtual address space; and means for enabling the computer to use said policy module for memory management operations that are related to said section of the application's virtual address space;

wherein said means for enabling the computer to create a policy module includes means for enabling the computer to accept a specification for a plurality of methods related to said memory management operations;

wherein said means for enabling the computer to accept a specification for a plurality of methods includes any combination of:

means for enabling the computer to accept a selection for a placement policy;
means for enabling the computer to accept a selection for a replication policy;
means for enabling the computer to accept a selection for a migration policy;
means for enabling the computer to accept a selection for a recovery policy;
means for enabling the computer to accept a selection for a page size; and
means for enabling the computer to accept a selection for a policy flag.

4. The computer program product according to claim 3, wherein said combination of means for enabling the computer to accept a specification for a plurality of methods includes:

said means for enabling the computer to accept a selection for a placement policy;
said means for enabling the computer to accept a selection for a replication policy;
said means for enabling the computer to accept a selection for a migration policy; and
said means for enabling the computer to accept a selection for a recovery policy.

5. The computer program product according to claim 4, wherein said combination of means for enabling the computer to accept a specification for a plurality of methods further includes:

said means for enabling the computer to accept a selection for a page size.

6. The computer program product according to claim 4, wherein said combination of means for enabling the computer to accept a specification for a plurality of methods further includes:

said means for enabling the computer to accept a selection for a policy flag.

7. The computer program product according to claim 3, wherein said combination of means for enabling the computer to accept a specification for a plurality of methods includes each of the following:

said means for enabling the computer to accept a selection for a placement policy;
said means for enabling the computer to accept a selection for a replication policy;
said means for enabling the computer to accept a selection for a migration policy;
said means for enabling the computer to accept a selection for a recovery policy;
said means for enabling the computer to accept a selection for a page size; and
said means for enabling the computer to accept a selection for a policy flag.

8. A system for memory management in a distributed shared memory multi-node computer system capable of executing a plurality of applications, each comprising one or more threads and having a virtual address space that is shared among the threads, said system comprising:

a policy module (PM) create module that creates a policy module associated with the application; and a PM attachment module that attaches said policy module to a section of the application's virtual address space;

wherein said policy module is used for memory management operations that are related to said section of the application's virtual address space;

wherein said PM create module specifies a plurality of methods related to said memory management operations, wherein said PM create module includes any combination of:

a placement policy selector;
a replication policy selector;
a migration policy selector;
a paging policy selector;
a page size specifier; and
a policy flag specifier.

9. The system for memory management according to claim 8, wherein said PM create module combination includes:

said placement policy selector;
said replication policy selector;
said migration policy selector; and
said paging policy selector.

10. The system for memory management according to claim 9, wherein said PM create module combination further includes:

said page size specifier.

11. The system for memory management according to claim 9, wherein said PM create module combination further includes:

said policy flag specifier.

12. The system for memory management according to claim 8, wherein said PM create module combination includes each of the following:

said placement policy selector;

said replication policy selector;
said migration policy selector;
said paging policy selector;
said page size specifier; and
said policy flag specifier.

13. A method for memory management in a distributed shared memory multi-node computer system capable of executing a plurality of applications, each comprising one or more threads and having a virtual address space that is shared among the threads, the method comprising the steps of:

creating a policy module associated with an application;

attaching the policy module to a section of the application's virtual address space; and using the policy module for memory management operations that are related to the section of the application's virtual address space;

wherein said step of creating a policy module includes the step of specifying a plurality of methods related to the memory management operations;

wherein said step of specifying a plurality of methods includes any combination of the following steps:
  selecting a placement policy;
  selecting a replication policy;
  selecting a migration policy;
  selecting a paging policy;
  selecting a recovery policy;
  selecting a page size; and
  selecting a policy flag.

14. The method for memory management according to claim 13, wherein said combination of steps for specifying a plurality of methods includes:

said step of selecting a placement policy;
said step of selecting a replication policy;
said step of selecting a migration policy; and
said step of selecting a paging policy.

15. The method for memory management according to claim 14, wherein said combination of steps for specifying a plurality of methods further comprises:

said step of selecting a recovery policy.

16. The method for memory management according to claim 14, wherein said combination of steps for specifying a plurality of methods further comprises:

said step of selecting a page size.

17. The method for memory management according to claim 14, wherein said combination of steps for specifying a plurality of methods further comprises:

said step of selecting a policy flag.

18. The method for memory management according to claim 13, wherein said combination of steps for specifying a plurality of methods includes each of the following:

said step of selecting a placement policy;
said step of selecting a replication policy;
said step of selecting a migration policy;
said step of selecting a paging policy;
said step of selecting a recovery policy;
said step of selecting a page size; and
said step of selecting a policy flag.

* * * * *